US010375731B2

(12) United States Patent
Zhou et al.

(10) Patent No.: US 10,375,731 B2
(45) Date of Patent: Aug. 6, 2019

(54) DYNAMIC FORBIDDANCE OF WIRELESS TRANSMISSIONS BY OVERLAPPING BASIC SERVICE SETS

(71) Applicant: QUALCOMM Incorporated, San Diego, CA (US)

(72) Inventors: Yan Zhou, San Diego, CA (US); Gwendolyn Denise Barriac, Encinitas, CA (US); George Cherian, San Diego, CA (US); Simone Merlin, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 15/263,109

(22) Filed: Sep. 12, 2016

(65) Prior Publication Data

US 2017/0127448 A1 May 4, 2017

Related U.S. Application Data

(60) Provisional application No. 62/247,711, filed on Oct. 28, 2015.

(51) Int. Cl.
*H04W 74/08* (2009.01)
*H04W 28/04* (2009.01)
*H04W 16/10* (2009.01)

(52) U.S. Cl.
CPC ....... *H04W 74/0816* (2013.01); *H04W 16/10* (2013.01); *H04W 28/04* (2013.01)

(58) Field of Classification Search
CPC .......................... H04W 74/081; H04W 28/048
See application file for complete search history.

(56) References Cited

U.S. PATENT DOCUMENTS

2013/0016642 A1* 1/2013 Banerjea ............. H04L 27/2613 370/311
2014/0328191 A1 11/2014 Barriac et al.
(Continued)

OTHER PUBLICATIONS

Rossi Jun Luo (Huawei): "OBSS NAV and PD Threshold Rule for Spatial Reuse ; 11-15-1109-00-00ax-obss-nav-and-pd-threshold-rulefor-spatial-reuse", IEEE Draft; 11-15-1109-00-00AX-OBSS-NAVAND-PD-Threshold-Rule-For-Spatial-Reuse, IEEE-SA Mentor, Piscataway, NJ USA, vol. 802.11ax, Sep. 14, 2015 (Sep. 14, 2015), pp. 1-20, XP068098351.*
(Continued)

*Primary Examiner* — Kevin C. Harper
*Assistant Examiner* — Henry Baron
(74) *Attorney, Agent, or Firm* — Holland & Hart LLP

(57) ABSTRACT

Techniques are provided for dynamic forbiddance of wireless transmissions by transmitters of one or more overlapping basic service set (OBSS) concurrent with transmissions of a transmitter in a first basic service set (BSS). A first transmitter of a first BSS may identify a transmission that is to be a protected transmission, and based on the identification may dynamically forbid one or more other transmitters of an OBSS that overlaps with the first BSS from concurrent transmissions with the protected transmission. An access point or station of an OBSS may receive an indication of the forbiddance of transmissions and may apply deferral rules to defer transmissions based on the forbiddance. One or more disincentive rules may be applied at the first transmitter to provide disincentives for forbidding OBSS reuse.

30 Claims, 15 Drawing Sheets

(56) References Cited

U.S. PATENT DOCUMENTS

| | | | |
|---|---|---|---|
| 2015/0124744 A1 | 5/2015 | Zhu et al. |
| 2015/0237578 A1 | 8/2015 | Gogate et al. |
| 2015/0264710 A1 | 9/2015 | Kneckt |
| 2015/0288428 A1 | 10/2015 | Choi et al. |

OTHER PUBLICATIONS

Geonjung Ko: Discussions on Spatial Reuse Enhancement; 11-15-1118-00-00ax-discussions-on-spatial-reuse-enhancement IEEE Draft; IEEE-SA Mentor Piscataway NJ USA; vol. 802.llax, Sep. 14, 2015 (2915-09-14), pp. 1-8, XP068098368.*

Yongho Seok (Newracom): "NAV Operation for Spatial Reuse; 11-15-0797-00-00ax-nav-operation-for-spatial-reuse", IEEE Draft; 11-15-0797-00-00AX-NAV-Operation-For-Spatial-Reuse, IEEE-SA Mentor, Piscataway, NJ USA, vol. 802.11ax, Jul. 11, 2015.*

Coffey et al., "Dynamic CCA Management—Spatial Reuse AP Management," IEEE Draft, Jan. 11, 2015, 9pgs, vol. 802.11ax, doc: IEEE 802.11-15/0105r0, XP068082652, IEEE-Sa Mentor, Piscataway, NJ, USA [retrieved on Jan. 13, 2015].

ISA/EP, International Search Report and Written Opinion of the International Searching Authority, Int'l Application No. PCT/US2016/051458, dated Dec. 1, 2016, European Patent Office, Rijswijk, NL, 13 pgs.

Jafarian et al., "BSS-TXOP," IEEE Draft, Sep. 14, 2015, 27 pgs., vol. 802.11ax, doc: IEEE 802.11-15/1110r0, XP068098353, IEEE-Sa Mentor, Piscataway, NJ, USA [retrieved on Sep. 14, 2015].

Ko et al., "Discussions on Spatial Reuse Enhancement," IEEE Draft, Sep. 14, 2015, 8 pgs, vol. 802.11ax, doc: IEEE 802.11-15/1118r0, XP068098368, IEEE-SA Mentor, Piscataway, NJ, USA [retrieved on Sep. 14, 2015].

Luo et al., "OBSS NAV and PD Threshold Rule for Spatial Reuse," IEEE Draft, Sep. 13, 2015, 20 pgs, vol. 802.11ax, doc: IEEE 802.11-15/1109r0, XP068098351, IEEE-Sa Mentor, Piscataway, NJ, USA [retrieved on Sep. 14, 2015].

Seok et al., "NAV Operation for Spatial Reuse," IEEE Draft, Jul. 10, 2015, 14 pgs., vol. 802.11 ax, doc: IEEE 802.11-15/0797r0, XP068094688, IEEE-Sa Mentor, Piscataway, NJ, USA [retrieved on Jul. 11, 2015].

* cited by examiner

DYNAMIC FORBIDDANCE OF WIRELESS TRANSMISSIONS BY OVERLAPPING BASIC SERVICE SETS

CROSS REFERENCES

The present application for patent claims priority to U.S. Provisional Patent Application No. 62/247,711 by Zhou et al., entitled "Dynamic Forbiddance of Wireless Transmissions by Overlapping Basic Service Sets," filed Oct. 28, 2015, assigned to the assignee hereof.

BACKGROUND

Field of the Disclosure

The present disclosure, for example, relates to wireless communication, and more particularly to techniques for dynamic forbiddance of wireless transmissions by overlapping basic service sets.

Description of Related Art

Wireless communications systems are widely deployed to provide various types of communication content, such as voice, video, packet data, messaging, broadcast, and so on. These systems may be multiple-access systems capable of supporting communication with multiple users by sharing the available system resources (e.g., time, frequency, and power).

A wireless network (e.g., a wireless local area network (WLAN), such as a Wi-Fi network conforming to one or more of the IEEE 802.11 family of standards) may include an access point (AP) that may communicate with one or more stations (STAs) or mobile devices. The AP may be coupled to a network, such as the Internet, and may enable a station or mobile device to communicate via the network (or communicate with other devices coupled to the AP in a service set, e.g., a basic service set (BSS) or extended service set (ESS)). A station may communicate with an associated AP bi-directionally. For example, a station may communicate with an associated AP via a downlink (DL) and an uplink (UL). The DL (or forward link) may refer to a communication link carrying transmissions from the AP to the station, and the UL (or reverse link) may refer to a communication link carrying transmissions from the station to the AP.

To enhance communication bandwidth, certain APs or STAs of a first BSS may transmit concurrently with other APs or STAs of another BSS in certain situations. In some cases, the other BSS may be an overlapping BSS (OBSS) with a coverage area that overlaps with a coverage area of the first BSS. Transmissions from an OBSS may interfere with transmissions in a neighboring BSS. Therefore, an AP or STA may scan for OBSSs and may enable or disable a transmission mode (e.g., 40 MHz operation) based at least in part on identifying an OBSS. In some cases, OBSS transmissions may interfere with a transmission of a transmitter in the first BSS. Thus, techniques to reduce such interference may be beneficial for efficient system operation.

SUMMARY

Various aspects of the present disclosure relate to systems, methods, or apparatuses for dynamic forbiddance of wireless transmissions by transmitters of one or more overlapping basic service sets (OBSSs) concurrent with transmissions of a transmitter in a first basic service set (BSS). In some aspects, a first transmitter of a first BSS may identify a transmission that is to be a protected transmission, and based on the identification may dynamically forbid one or more other transmitters of an OBSS that overlaps with the first BSS from concurrent transmissions with the protected transmission. In some examples, the first transmitter may identify one or more characteristics of the first transmission, and dynamically forbid transmitters of the OBSS from transmitting based on the identified one or more characteristics. In some examples, the one or more characteristics may include channel quality characteristics or quality of service (QoS) characteristics. The first transmitter of the first BSS may set a value in a preamble of a frame (e.g., in the first transmission) that indicates that concurrent OBSS transmissions are forbidden. An access point (AP) or station (STA) of an OBSS may receive the indication of the forbiddance of transmissions from the first transmitter, and may apply deferral rules to defer transmissions based on the forbiddance. In certain aspects, one or more disincentive rules may be applied at the first transmitter to provide disincentives for forbidding OBSS transmissions.

A method of wireless communication is described. The method may include identifying a first transmission to be transmitted from a first transmitter of a first BSS and dynamically forbidding one or more other transmitters of an OBSS that overlaps with the first BSS from concurrent transmissions with the first transmitter during the first transmission. In some examples, the dynamically forbidding may include setting a value in a preamble of a frame that indicates concurrent OBSS transmissions are forbidden.

An apparatus for wireless communication is described. The apparatus may include means for identifying a first transmission to be transmitted from a first transmitter of a first BSS and means for dynamically forbidding one or more other transmitters of an OBSS that overlaps with the first BSS from concurrent transmissions with the first transmitter during the first transmission. In some examples, the means for dynamically forbidding may include means for setting a value in a preamble of a frame that indicates concurrent OBSS transmissions are forbidden.

A further apparatus is described. The apparatus may include a processor, memory in electronic communication with the processor, and instructions stored in the memory. The instructions may be executable by the processor to cause the apparatus to identify a first transmission to be transmitted from a first transmitter of a first BSS and dynamically forbid one or more other transmitters of an OBSS that overlaps with the first BSS from concurrent transmissions with the first transmitter during the first transmission. In some examples, the instructions may also be executable by the processor to cause the apparatus to set a value in a preamble of a frame that indicates concurrent OBSS transmissions are forbidden.

A non-transitory computer readable medium for wireless communication is described. The non-transitory computer-readable medium may include instructions executable to identify a first transmission to be transmitted from a first transmitter of a first BSS and dynamically forbid one or more other transmitters of an OBSS that overlaps with the first BSS from concurrent transmissions with the first transmitter during the first transmission. In some examples, the non-transitory computer-readable medium may also include instructions executable to set a value in a preamble of a frame that indicates concurrent OBSS transmissions are forbidden.

In some examples of the method, apparatus, or non-transitory computer-readable medium described above, the identifying the first transmission further includes identifying one or more characteristics of the first transmission, and the dynamically forbidding is based on the identified one or more characteristics. In some examples of the method, apparatus, or non-transitory computer-readable medium described above, the one or more characteristics include one or more channel quality characteristics or QoS characteristics.

In some examples of the method, apparatus, or non-transitory computer-readable medium described above, the one or more channel quality characteristics include one or more of: a protocol data unit (PDU) failure rate that exceeds an associated threshold, a PDU error rate that exceeds an associated threshold, a PDU retry count that exceeds an associated threshold, a signal-to-interference-and-noise ratio (SINR), a received signal strength indication (RSSI), or a maximum supported modulation and coding scheme (MCS) that is less than an associated threshold, a percentage of transmissions that experience bursty interference that exceeds an associated threshold, an SINR degradation of data payload versus preamble that exceeds a threshold, or an accessed air time that is less than an associated threshold.

In some examples of the method, apparatus, or non-transitory computer-readable medium described above, the one or more QoS characteristics include one or more of a latency associated with data to be transmitted in the transmission of the first transmitter or a transmission priority associated with data to be transmitted by the first transmitter. In some examples of the method, apparatus, or non-transitory computer-readable medium described above, the dynamically forbidding may include an indication that transmitters of the OBSS are to use a normal preamble detection (PD) level and honor a network allocation vector (NAV) of the data frame.

In some examples of the method, apparatus, or non-transitory computer-readable medium described above, the setting the value in the preamble of the frame includes setting a color field in a preamble of a data frame of the first transmission to a predefined value that indicates concurrent OBSS transmissions are forbidden. In some examples of the method, apparatus, or non-transitory computer-readable medium described above, the setting the value in the preamble of the frame includes setting a flag in the preamble of the frame.

In some examples of the method, apparatus, or non-transitory computer-readable medium described above, the dynamically forbidding includes transmitting one or more of a request-to-send (RTS) or a clear-to-send (CTS) transmission preceding the transmission of the first transmitter. In some examples of the method, apparatus, or non-transitory computer-readable medium described above, the RTS or CTS transmission indicates to the one or more transmitters of the OBSS that concurrent transmissions are forbidden according to legacy deferral rules.

In some examples of the method, apparatus, or non-transitory computer-readable medium described above, the dynamically forbidding includes transmitting an interference threshold in a preamble of a data frame transmitted during the transmission, the interference threshold indicating an amount of interference tolerated by the data frame. In some examples of the method, apparatus, or non-transitory computer-readable medium described above, the dynamically forbidding further includes setting the interference threshold at a low level to indicate concurrent OBSS transmissions are forbidden through allowance of little or no interference.

In some examples of the method, apparatus, or non-transitory computer-readable medium described above, the dynamically forbidding includes formatting a data frame transmitted by the first transmitter during the transmission as a non-high-efficiency (non-HE) frame that indicates to the one or more transmitters of the OBSS that concurrent transmissions are forbidden according to legacy deferral rules. In some examples of the method, apparatus, or non-transitory computer-readable medium described above, the dynamically forbidding further includes setting a flag in a preamble of the non-HE frame.

In some examples of the method, apparatus, or non-transitory computer-readable medium described above, the flag is a bit located in a service field, a transmitter address field, or a receiver address field. Some examples of the method, apparatus, or non-transitory computer-readable medium described above may further include processes, features, means, or instructions for applying one or more disincentive rules based on the dynamically forbidding concurrent transmissions.

In some examples of the method, apparatus, or non-transitory computer-readable medium described above, the one or more disincentive rules are configured by an AP and transmitted to one or more stations of the first BSS. In some examples of the method, apparatus, or non-transitory computer-readable medium described above, the one or more disincentive rules include transmitting only non-HE data frames for a predetermined time period if a non-HE frame is used to indicate to the one or more transmitters of the OBSS that concurrent transmissions are forbidden.

In some examples of the method, apparatus, or non-transitory computer-readable medium described above, the one or more disincentive rules include indicating a lower channel priority for the first transmission than the channel priority that would be indicated if the first transmission were transmitted without an indication that concurrent transmissions are forbidden. In some examples of the method, apparatus, or non-transitory computer-readable medium described above, the one or more disincentive rules include limiting available wireless resources that may be used to indicate concurrent transmissions are forbidden to a subset of available resources.

In some examples of the method, apparatus, or non-transitory computer-readable medium described above, the method is performed by an AP in the first BSS. Some examples of the method, apparatus, or non-transitory computer-readable medium described above may further include processes, features, means, or instructions for transmitting, by the AP, information to one or more stations in the first BSS to enable the one or more stations to identify data frame characteristics and dynamically forbid other transmitters of the OBSS from transmitting during a transmission of the one or more stations.

In some examples of the method, apparatus, or non-transitory computer-readable medium described above, the information includes a single bit indicator transmitted to the one or more stations. In some examples of the method, apparatus, or non-transitory computer-readable medium described above, the information includes one or more parameters for use by the one or more stations to determine whether to enable the identification (ID) of data frame characteristics and dynamically forbid other transmitters of the OBSS from transmitting during a transmission of the one or more stations.

In some examples of the method, apparatus, or non-transitory computer-readable medium described above, the one or more parameters include an allowed interference parameter that is set to a low value to forbid concurrent transmissions through allowance of little or no interference, or that is set to a high value to allow concurrent transmissions through allowance of higher levels of interference. In some examples of the method, apparatus, or non-transitory computer-readable medium described above, the method is performed by a station in the first BSS. Some examples of the method, apparatus, or non-transitory computer-readable medium described above may further include processes, features, means, or instructions for receiving, at the station, information from an AP in the first BSS to enable the station to identify data frame characteristics and dynamically forbid other transmitters of the OBSS from transmitting during a transmission of the station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
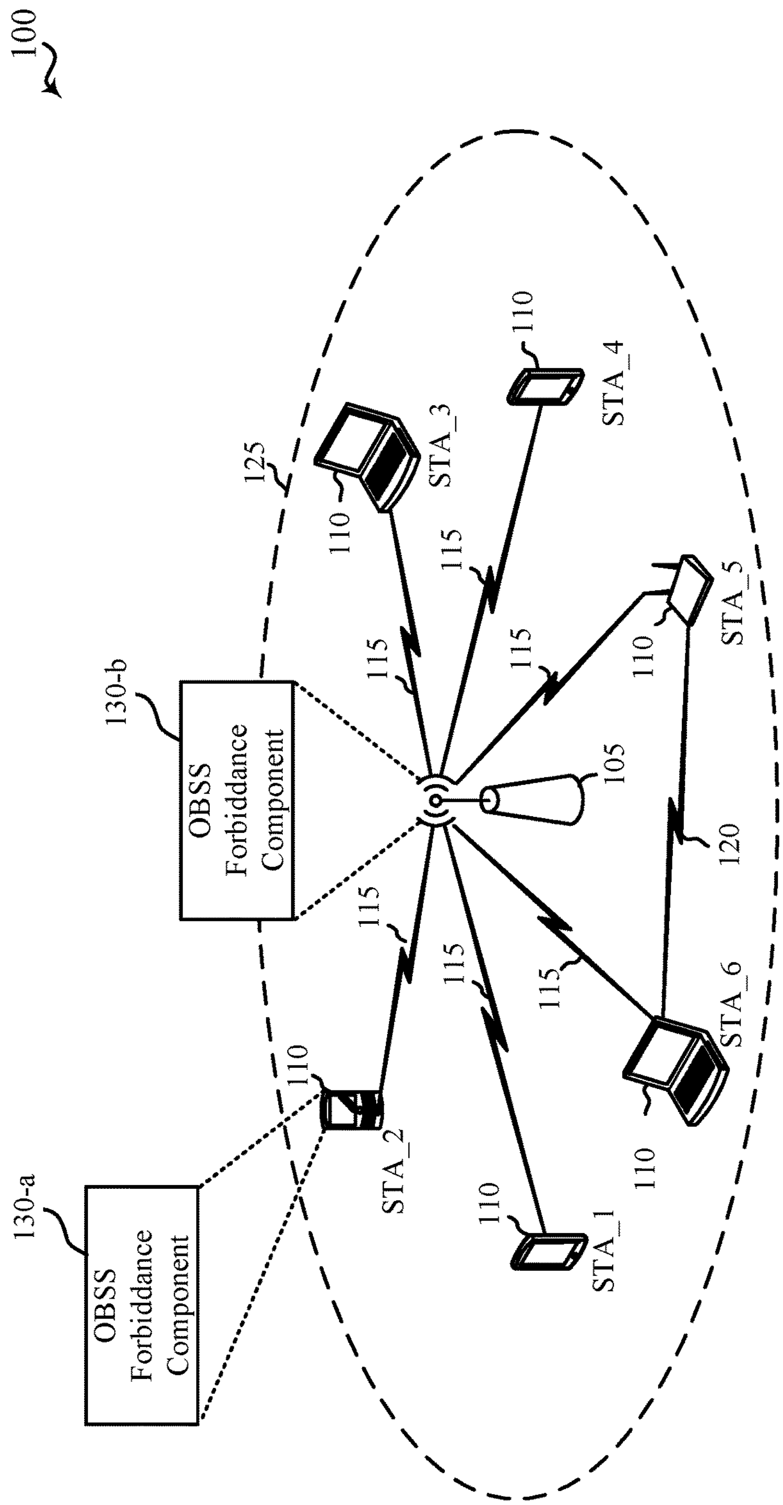
FIG. 1 shows a block diagram of a WLAN, in accordance with various aspects of the present disclosure.

The described features generally relate to improved systems, methods, and/or apparatuses for dynamic forbiddance of wireless transmissions by overlapping basic service sets (OBSSs). In some aspects, a first transmitter of a first basic service set (BSS) may identify a transmission that is to be a protected transmission, and based on the identification may dynamically forbid one or more other transmitters of an OBSS that overlaps with the first BSS from concurrent transmissions with the protected transmission. For example, the first transmitter, such as an access point (AP) or a station (STA) of the first BSS may have data with a quality of service (QoS) parameter indicating that highly reliable transmission is desired for the data. In the event that an OBSS transmitter reuses a wireless channel for concurrent transmissions with the transmission of the data from the first transmitter, the reliable delivery of the data may be compromised. In some examples, the first transmitter may dynamically forbid transmitters of the OBSS from transmitting during the transmission of the data, to help ensure more reliable delivery.

In certain examples, the first transmitter may determine that OBSS reuse is to be forbidden based on channel conditions of the wireless channel. For example, if the first transmitter has had a certain number of consecutive transmissions without receiving an acknowledgment of receipt, it may be likely that OBSS reuse has interfered with the transmissions and the first transmitter may determine that OBSS reuse is to be forbidden. In other examples, other channel quality metrics may be used, such as, for example, failure rates, error rates, retry counts, or signal strength, to name but a few examples.

In some examples, the first transmitter may indicate that OBSS reuse is forbidden through setting a value in the preamble of a frame or including an indication in a field of a data frame transmission indicating that concurrent OBSS transmissions are forbidden. In other examples, the first transmitter may indicate that OBSS reuse is forbidden through transmission of a request to send (RTS) transmission, a clear to send (CTS) transmission, of a CTS to self (CTS2Self) transmission. In still other examples, the first transmitter may indicate that OBSS reuse is forbidden through transmission of a non-high-efficiency (non-HE) frame. An AP or STA of the OBSS may receive an indication of the forbiddance of transmissions from the first transmitter, and may apply deferral rules to defer transmissions based on the forbiddance. In some aspects, these deferral rules are the same deferral rules that Wi-Fi networks have been using in previous standards (e.g., IEEE 802.11ac, and earlier). In certain aspects, one or more disincentive rules may be applied at the first transmitter, or first BSS, to provide disincentives for forbidding OBSS transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates a wireless local area network (WLAN) 100 (also known as a wireless fidelity (Wi-Fi) network) that supports dynamic forbiddance of wireless transmissions by OBSSs in accordance with various aspects of the present disclosure. The WLAN network 100 may include an AP 105 and multiple associated STAs 110, such as STA_1 through STA_6, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 110 may represent a BSS or an ESS. The various STAs 110 in the network are able to communicate with one another through the AP 105. Also shown is a coverage area 125 of the AP 105, which may represent a basic service area (BSA) of the WLAN network 100. An extended network station (not shown) associated with the WLAN network 100 may be connected to a wired or wireless distribution system (DS) that may allow multiple APs 105 to be connected in an ESS.

Although not shown in FIG. 1, a STA 110 may be located in the intersection of more than one coverage area 125 and may associate with more than one AP 105. A single AP 105 and an associated set of STAs 110 may be referred to as a BSS. An ESS is a set of connected BSSs. ADS may be used to connect APs 105 in an ESS. In some cases, the coverage area 125 of an AP 105 may be divided into sectors. The WLAN network 100 may include APs 105 of different types (e.g., metropolitan area, home network, etc.), with varying and overlapping coverage areas 125. Two STAs 110 may also communicate directly via a direct wireless link 120 regardless of whether both STAs 110 are in the same coverage area 125. Examples of direct wireless links 120 may include Wi-Fi Direct connections, Wi-Fi Tunneled Direct Link Setup (TDLS) links, and other group connections. STAs 110 and APs 105 may communicate according to the WLAN radio and baseband protocol for physical (PHY) and medium access control (MAC) layers. In other implementations, peer-to-peer connections or ad hoc networks may be implemented within WLAN network 100.

When coverage areas associated with multiple BSSs overlap with one another, the BSSs may be referred to as OBSSs, as mentioned above. Note that BSSs may be considered overlapping even if only some of the STAs in each BSS overlap. In these instances, a STA 110 may communicate with an AP 105 while in the presence of interfering transmissions from other OBSSs. In some cases, the STA 110 may detect interfering transmissions (e.g., during a clear channel assessment (CCA)) from an OBSS. While this example is described for STA 110, similar techniques may be used by AP 105 as well. After detecting the interfering transmission, STA 110 may then identify whether the interfering transmission is associated with an OBSS. If the interfering transmission is not associated with an OBSS (e.g., transmission from other wireless device in the current BSS), STA 110 should defer to the transmission.

In other cases, after identifying the interfering transmission is associated with an OBSS, the STA 110 may compare a received signal strength indication (RSSI) or power density of the interfering transmission with an OBSS threshold value. If the RSSI or power density is above the OBSS threshold, STA 110 may refrain from transmitting in accordance with a collision-based protocol. Conversely, if the RSSI or power density is below the OBSS threshold, STA 110 may conduct transmissions to AP 105 concurrently with the interfering transmission. In this way, OBSSs may reuse communication resources and increase throughput at the network. An interfering transmission may include a WLAN packet, which may include a preamble and a data region. In some instances, the STA 110 could reduce its transmit power to increase the OBSS threshold value so that it could transmit on top of the OBSS packet.

Therefore, a wireless device, such as an AP 105 or a STA 110, may efficiently reuse wireless resources and enhance network efficiency. In some cases a receiver, such as a STA 110, may be located relatively close to an OBSS transmitter and be associated with an AP 105 that is relatively distant. The OBSS transmitter may, however, identify transmissions from the AP 105 as OBSS transmissions that allow reuse, and transmit concurrently with the AP 105, and interfere with reception of the transmission at the STA 110. Various aspects of the disclosure provide techniques for a transmitter, such as an AP 105 or STA 110 of a first BSS, to forbid OBSS reuse and allow the STA 110 to more reliably receive transmissions from its associated AP 105. In some examples, one or more of the STAs 110 may include an OBSS forbiddance component 130-*a*, that manages dynamic forbiddance of OBSS transmissions. Similarly, AP 105 may include an OBSS forbiddance component 130-*b*, that manages dynamic forbiddance of OBSS transmissions.

Figure 2:
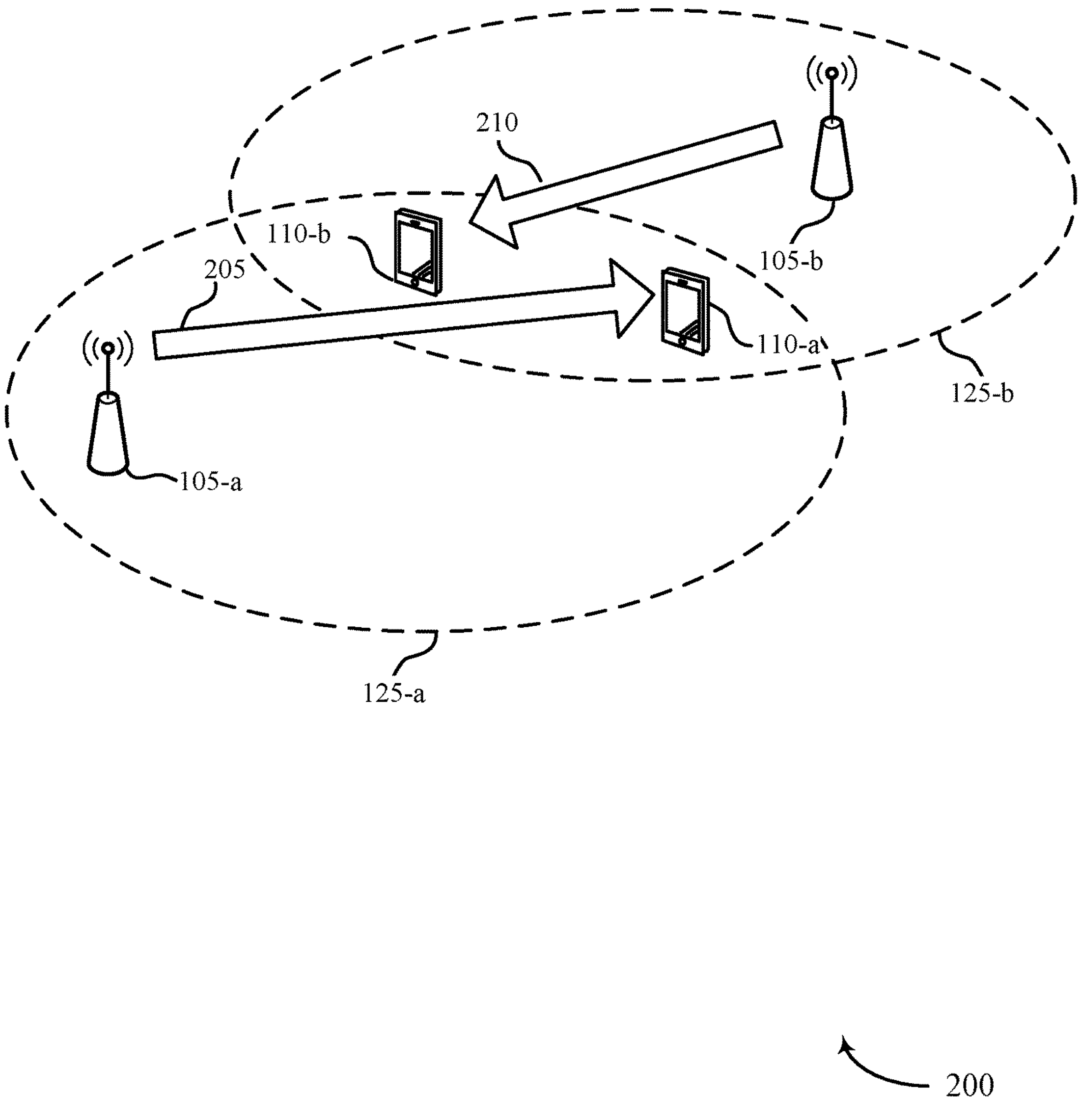
FIG. 2 illustrates an example of a wireless communications subsystem having overlapping basic service sets (OBSSs) that supports dynamic forbiddance of wireless transmissions by transmitters of one or more OBSS, in accordance with various aspects of the present disclosure.

FIG. 2 illustrates an example of a wireless communications subsystem 200 with OBSSs, that supports dynamic forbiddance of wireless transmissions by OBSSs in accordance with various aspects of the present disclosure. Wireless communications subsystem 200 may include a first STA 110-*a*, a second STA 110-*b*, a first AP 105-*a*, and a second AP 105-*b*, which may be examples of a STA 110 or an AP 105 and may communicate with one another as described above with reference to FIG. 1. In one example, first AP 105-*a* and first STA 110-*a* may be associated with a first BSS having coverage area 125-*a*, while second AP 105-*b* and second STA 110-*b* may be associated with a second OBSS having overlapping coverage area 125-*b*.

In this example, first STA 110-*a* may be located relatively closer to second AP 105-*b* than to its associated first AP 105-*a*. The second AP 105-*b* may, however, identify first transmissions 205 from first AP 105-*a* as OBSS transmissions that allow reuse, and transmit second transmissions 210 to the second STA 110-*b* concurrently with the first transmissions 205 of first AP 105-*a*. Due to the relatively close proximity of the first STA 110-*a* to the second AP 105-*b*, the concurrent second transmissions 210 may cause interference with the reception of first transmissions 205, and may result in unsuccessful reception of first transmissions 205 at first STA 110-*a*. Such a situation may result in over-reuse of a wireless channel, and may degrade network performance. As mentioned above, in some aspects of the disclosure, the first AP 105-*a* or the first STA 110-*a* of a first BSS may forbid OBSS reuse, thus forbidding second AP 105-*b* from transmitting second transmissions 210 concurrently with the first transmissions 205. The first AP 105-*a* or the first STA 110-*a* of the first BSS may forbid OBSS reuse by setting a value in a preamble of a frame (e.g., in a first transmission 205) that indicates that concurrent OBSS transmissions are forbidden. Such a technique may allow the first STA 110-*a* to more reliably receive first transmissions 205 from first AP 105-*a*.

Figure 3:
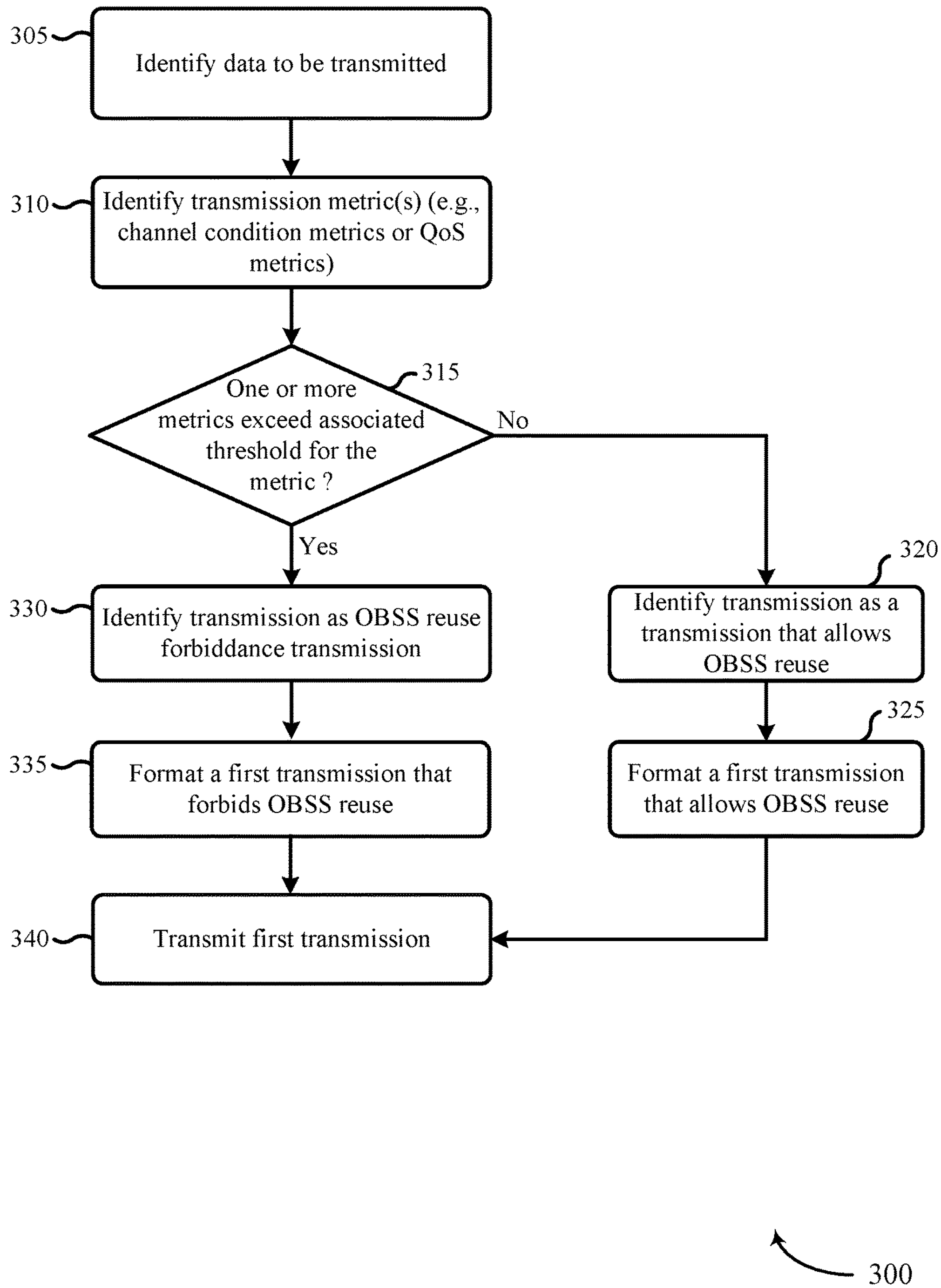
FIG. 3 illustrates an example of a process flow that supports dynamic forbiddance of wireless transmissions by transmitters of one or more OBSS in accordance with various aspects of the present disclosure.

FIG. 3 illustrates an example of a process flow 300 for dynamic forbiddance of wireless transmissions by OBSS transmitters in accordance with various aspects of the present disclosure. Process flow 300 may be performed by STA or an AP, referred to generally as a transmitter, which may be an example of a STA 110 and AP 105 described above with reference to FIGS. 1-2. The transmitter may, as indicated at block 305, identify data that is to be transmitted. The data may be provided, for example, by an application executing on the transmitter that is to be transmitted over a wireless channel of a BSS to a receiver (e.g., an AP or STA that is to receive the data). In some examples, an AP may identify a data exchange that is to occur with a STA, and the data to be transmitted may include both data to be transmitted by the AP and transmitted by the STA. In other examples, a STA may be configured to transmit certain data periodically to an AP.

At block 310, the transmitter, in some examples, may identify transmission metrics associated with transmission of the data. For example, a transmitter may identify channel quality characteristics, QoS characteristics, or combinations thereof, as the transmission metrics. Channel quality characteristics may include, for example, a protocol data unit (PDU) failure rate associated with previous transmissions to a particular receiver, a PDU error rate associated with previous transmissions to the receiver, a PDU retry count associated with the receiver, a signal-to-interference-and-noise ratio (SINR), an RSSI, a maximum supported modulation and coding scheme (MCS), a percentage of transmissions that experience bursty interference, an SINR degradation of data payload versus preamble, or an accessed air time, to name a few examples. The QoS characteristics may include a QoS associated with the identified data, such as a latency associated with the identified data or a transmission priority associated with the identified data, for example.

At block 315, the transmitter may determine whether one or more metrics exceed a threshold associated with the metric. For example, if a transmitter has not received an acknowledgment of receipt of a threshold number of consecutive transmissions, the transmitter may determine that the PDU failure rate exceeds the threshold. Similarly, if a percentage of PDUs for a certain time period (e.g., a set number of beacon periods) without acknowledgments exceeds an associated threshold, the transmitter may determine that the PDU failure rate exceeds the threshold. Similar thresholds may be established for either of the channel quality or QoS characteristics.

If it is determined that the one or more metrics do not exceed an associated threshold, the transmitter may identify a transmission of the data as a transmission that allows OBSS reuse, as indicated at block 320. Such a determination may be the result of, for example, one or more OBSS transmitters not interfering significantly with transmissions between the transmitter and one or more receivers.

At block 325, the transmitter may format a first transmission that allows OBSS reuse. Such formatting may be made through setting a value in a preamble of a frame or through one or more fields in a data frame including part of all of the data to be transmitted, such as through setting a flag in a data field to indicate OBSS reuse is permitted. In some examples, a color field in a Wi-Fi data frame may be selected to allow OBSS transmitters to reuse a wireless channel. In the event that a transmitter of an OBSS receives such a transmission, the OBSS transmitter may transmit a transmission concurrent with a transmission of the identified data.

If it is determined that the one or more metrics do exceed an associated threshold at block 315, the transmitter may identify the transmission as an OBSS reuse forbiddance transmission. Such a determination may be the result of, for example, one or more OBSS transmitters causing substantial interference with transmissions between the transmitter and one or more receivers. In some examples, a transmitter may skip the operations of blocks 310 and 315, and simply identify each transmission as an OBSS reuse forbiddance transmission. Such transmitters may be, for example, transmitters (e.g., transmitters in embedded devices) that have limited power capacity, transmit relatively infrequently, and/or transmit data having a high QoS requirement of a high channel priority.

At block 335, the transmitter may format the first transmission that forbids OBSS reuse. Such formatting may include, in some examples, setting a value in a preamble of a WLAN frame of the first transmission that indicates OBSS reuse is forbidden. In some cases, the WLAN frame may be a high efficiency (HE) WLAN frame, and the HE WLAN frame may be formatted to include the value that indicates OBSS reuse is forbidden. For example, such a HE WLAN frame may be formatted, with a color field in a preamble of the frame that has a predefined value that indicates concurrent OBSS transmissions, or OBSS reuse transmissions, are forbidden. Such color fields may be included in a HE WLAN preamble, and, if the frame is not of HE format, may be an identifier of a BSS. The value of the color field may be a unique or non-unique identifier of the BSS included in all WLAN PDUs generated by the BSS's members. The value of the color field for an HE downlink (DL) WLAN PDU may be selected by an AP during BSS initialization, and may be maintained for the duration of the existence of the BSS. The value of the color field for an HE uplink (UL) WLAN PDU may be set by a non-AP station to a value of a color field associated with a most recently received frame from the AP with which the station is associated, or to a value of a color field indicated in a beacon of an OBSS of which the station is a member. In some examples, a common reserved "reuse forbidding" color may be used in the color field to indicate reuse is forbidden.

In some examples, the formatting of the first transmission may include setting a flag in a preamble of a WLAN frame that indicates OBSS reuse is forbidden. Such a flag may be included as one or more bits in a separate field of a WLAN preamble, for example, or may be included as one or more bits in another field of the WLAN preamble. In some examples, such an indication may be provided as one bit in a PHY header of a WLAN frame.

In other examples, the formatting of the first transmission may include formatting the transmission to include one or more of a RTS or a CTS (including a CTS2Self) transmission preceding the transmission of a WLAN frame including the identified data. The RTS or CTS transmission may indicate, for example, to an OBSS transmitter that concurrent transmissions are forbidden. In such examples, forbidding of OBSS reuse may be standardized for all transmissions with an associated RTS/CTS transmission. Or, more simply, if standard deferral rules are applied to legacy RTS/CTS, then OBSS transmissions will not reuse on top of transmissions protected by legacy RTS/CTS, and thus legacy RTS/CTS acts as a protection mechanism for transmissions.

In still other examples, the formatting of the first transmission may include formatting the transmission to include an interference threshold in a preamble of a WLAN frame. Such an interference threshold may indicate an amount of interference tolerated by a data frame, and may be used to dynamically adjust an amount of interference that may be generated in a particular transmission. For example, the interference level tolerated may be set relatively low, effectively preventing an OBSS transmitter from making any transmissions, or may be set relatively high to effectively allow any OBSS reuse in the event that other OBSS reuse parameters (e.g., OBSS power density threshold) are met.

In some further examples, the transmitter may format a data frame as a non-HE frame to indicate OBSS reuse is forbidden. In such examples, forbidding of OBSS reuse may be standardized for all transmissions with an associated non-HE frame, unless there is a special indication in the non-HE frame. In other examples, a non-HE frame may include a flag in a preamble of the non-HE frame that indicates OBSS reuse is forbidden or not forbidden, such as a bit located in a service field, a transmitter address field, or a receiver address field, for example. In still further examples, non-HE frames may be preceded by an RTS/CTS transmission to indicate OBSS reuse is forbidden, and where a standard is established to provide no reuse in the event an OBSS transmitter detects a RTS/CTS transmission.

At block 340, the transmitter may transmit the first transmission. In the event that the first transmission is formatted to forbid OBSS reuse, an OBSS transmitter that receives the first transmission may apply deferral rules associated with OBSS reuse. Such deferral rules may provide that the OBSS transmitter use a normal preamble detection (PD) level (e.g., a PD level of −82 dBm) and honor a network allocation vector (NAV) of the data frame, such as used in established legacy WLAN transmissions.

In some examples, when a transmitter transmits the first transmission with a reuse forbidden format/indication, the transmitter may also apply one or more disincentive rules designed to discourage transmitters from forbidding OBSS reuse. Such disincentive rules may be applied by an AP, or configured by an AP and transmitted to a STA, for example. Such disincentive rules may also be preprogrammed in devices. Such disincentive rules may include, for example, mandating that if the transmitter forbids reuse on its packets, using any of the methods previously described, it may not itself reuse on top of OBSS packets. This disincentive can apply per packet, per time period, per session, or per node. For example, in one instance the mandate to not reuse on OBSS packets can apply only when the transmitter is sending a protected packet which forbids reuse. In another instance, if the transmitter is forbidding reuse on its packets in a particular time period, it may not reuse on OBSS transmissions during that time period. In another instance, if a transmitter is forbidding reuse on some packets of a particular flow, it may reuse on top of OBSS packets to send any packets of that flow. In another instance, if a transmitter is sending protected packets forbidding reuse, it may never reuse on top of OBSS packets.

In other examples, the disincentive rules may include a channel priority adjustment rule, in which a lower channel priority for the first transmission, which forbids OBSS reuse, is applied than the channel priority that would be applied if the first transmission were transmitted without forbidding OBSS reuse. For example, an enhanced distributed channel access (EDCA) may be set to a less aggressive value for a particular access class (AC), which may result in an associated contention window (CW) set with a higher maximum value than a CW for a more aggressive value. In further examples, the disincentive rules may include limiting available wireless resources that may be used for OBSS forbidden transmissions (e.g., a certain percentage of transmissions, certain orthogonal frequency division multiple access (OFDMA) bands, or a certain period of time), which may be a subset of available wireless resources (e.g., 5% or 10% or available resources). In certain examples, if a transmitter is sending transmissions that forbid OBSS reuse, the transmitter may not be allowed to employ OBSS reuse itself for a time period that may be selected based on the disincentive rules (e.g., may not employ OBSS reuse ever, for a predetermined time period, or only while transmitting the data frames with OBSS reuse forbidden).

As mentioned, the process flow 300 may be used by an AP or a STA in a BSS. In some examples, an AP may configure STAs of a BSS to enable or disable forbidding of OBSS reuse. For example, an AP may transmit a forbid reuse or "FR" allowed indicator (e.g., a 1 bit indicator) to STAs in a BSS to allow the STAs to format transmissions to forbid OBSS reuse. In some examples, the AP may configure STAs on a per-STA basis to enable or disable forbidding of OBSS reuse. In other examples, an AP may provide a set of guidelines for use by STAs in deciding whether to forbid OBSS reuse, and the STAs may decide whether to use protection given the guidelines. In other examples, an AP may simply allow STAs to decide for themselves whether to forbid OBSS reuse, which also may be done on a per-STA basis. In certain examples, an AP may broadcast/unicast/multicast the indicator to STAs of a BSS (e.g., an AP can broadcast the indicator in a beacon transmission). In some examples, a managed network may include a number of managed BSSs, and in such a managed network, "forbid reuse" can be allowed/disallowed across the entire network by configuring all APs to send the corresponding indicator. In a managed network, over reuse issues may be mitigated through more control in frequency channel planning, so "forbid reuse" may be disallowed to maximize reuse gain. In further examples, an AP may manage whether reuse is allowed in a network through configuring an "allowed interference" indicator to be very low (to allow very limited or no reuse), very high (to allow reuse), or varying levels between (to allow limited reuse).

Figure 4:
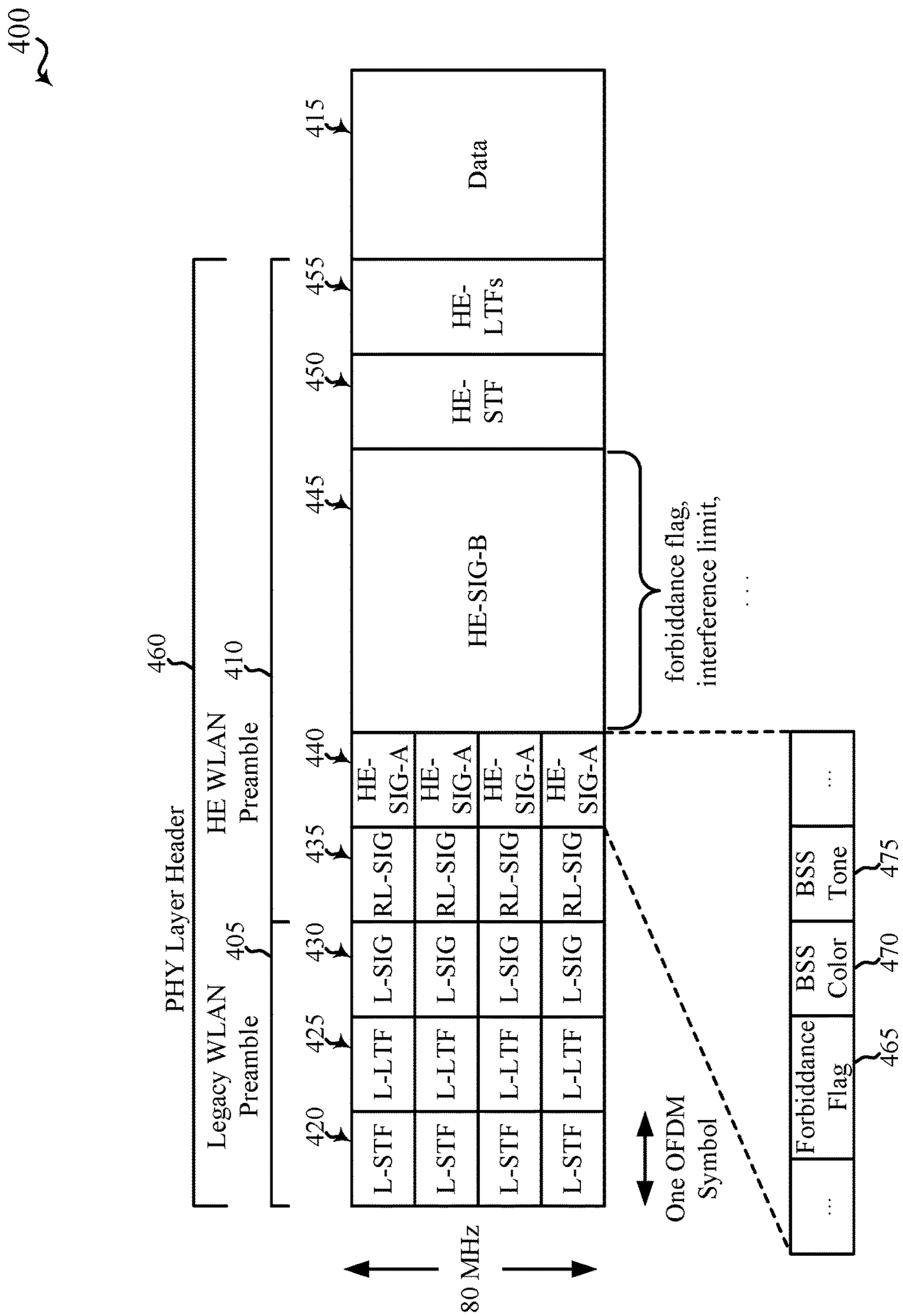
FIG. 4 illustrates an example of a WLAN packet structure for identifying an OBSS transmission forbiddance in accordance with various aspects of the present disclosure.

FIG. 4 shows an example of a WLAN PDU 400 (e.g., a physical layer convergence PDU (PPDU)) usable for communications between APs and stations, in accordance with various aspects of the present disclosure. The AP may be an example of aspects of the AP 105 described with reference to FIGS. 1-3, and the stations may be examples of aspects of the stations 110 described with reference to FIGS. 1-3.

The WLAN PDU 400 may include a physical (PHY) layer header 460 and a data field 415 (e.g., a MAC PDU (MPDU) or physical layer service data unit (PSDU)). The physical layer header 460 may include a legacy WLAN preamble 405 and/or a HE WLAN preamble 410. The preambles and data field may be transmitted in the following order: legacy WLAN preamble 405, HE WLAN preamble 410, data field 415.

The WLAN PDU 400 may be transmitted over a radio frequency spectrum band, which in some examples may include a plurality of sub-bands. In some examples, the radio frequency spectrum band may have a bandwidth of 80 MHz, and each of the sub-bands may have a bandwidth of 40 MHz.

The legacy WLAN preamble 405 may include legacy short training field (STF) (L-STF) information 420, legacy long training field (LTF) (L-LTF) information 425, and/or legacy signaling (L-SIG) information 430. When the radio frequency spectrum band includes a plurality of sub-bands, the L-STF, L-LTF, and L-SIG information may be duplicated and transmitted in each of the plurality of sub-bands.

The HE WLAN preamble 410 may include a repeated legacy WLAN signaling field (RL-SIG) 435, a first WLAN signaling field 440 (e.g., a first HE WLAN signaling field (labeled HE-SIG-A)), a second WLAN signaling field 445 (e.g., a second HE WLAN signaling field (labeled HE-SIG- B)), a WLAN STF (e.g., a HE WLAN STF, labeled HE-STF 450), at least one WLAN LTF (e.g., at least one HE WLAN LTF, labeled HE-LTFs 455).

When the radio frequency spectrum band includes a plurality of sub-bands, the L-SIG information 420 (from the legacy WLAN preamble 405) may be duplicated and transmitted in each sub-band of the repeated legacy WLAN signaling field 435 as repeated legacy signaling (RL-SIG) information. The repeated legacy WLAN signaling field 435 may indicate to a station that the WLAN PDU 400 is an IEEE 802.11ax WLAN PDU.

The first WLAN signaling field 440 may include HE WLAN signaling information usable by APs and stations other than a number of APs or stations identified to receive or transmit communications in the WLAN PDU 400. The first WLAN signaling field 440 may also include information usable by the identified number of APs or stations to decode the second WLAN signaling field 445. Furthermore, the first WLAN signaling field 440 may include information on OBSS reuse forbiddance. When the radio frequency spectrum band includes a plurality of sub-bands, the information (e.g., HE-SIG-A information) included in the first WLAN signaling field 440 may be duplicated and transmitted in each sub-band of the first WLAN signaling field 440.

The second WLAN signaling field 445 may include HE WLAN signaling information usable by a number of APs or stations identified to transmit or receive communications in the WLAN PDU 400. More specifically, the second WLAN signaling field 445 may include information usable by the number of APs or stations to transmit/encode or receive/decode data in the data field 415. Furthermore, the second WLAN signaling field 445 may include information on OBSS reuse forbiddance. The second WLAN signaling field 445 may be encoded separately from the first WLAN signaling field 440.

The HE WLAN preamble 410 may also include an identifier of a BSS. The identifier of the BSS may include a value of a color field (e.g., a BSS color field 470). The value of the color field may be a unique or non-unique identifier of the BSS, and may be included in all WLAN PDUs generated by the BSS's members. In some examples, a particular value of the color field 470 may indicate that OBSS reuse is forbidden, as discussed above. The HE WLAN preamble 410 may also include a BSS tone field 475, which may be used as an extension of the BSS color field. When the WLAN PDU 400 is an HE DL SU WLAN PDU, the BSS tone field 475 may be used to identify one or more intended receivers of a transmission. In some cases, a BSS tone field 475 may be included in the first WLAN signaling field 440.

The HE WLAN preamble 410 may further include an OBSS reuse forbiddance indicator (e.g., one or more bits or a binary forbiddance flag 465) indicating whether OBSS transmitters may reuse a wireless channel for concurrent transmissions with the WLAN PDU 400. In some examples, the forbiddance flag 465 may be set to indicate OBSS reuse is forbidden, and that OBSS transmitters are to follow legacy deferral rules. The forbiddance flag may be cleared to indicate that OBSS reuse is allowed. These fields may also be included in enhanced RTS and/or CTS fields.

Additionally or alternatively, the second WLAN signaling field 445 may include the OBSS reuse forbiddance indicator (e.g., a forbiddance flag) indicating whether OBSS transmitters may reuse a wireless channel for concurrent transmissions with the WLAN PDU 400. In some examples, the second WLAN signaling field 445 may also include other types of forbiddance indicators, such as an interference limit that may be set to allow OBSS reuse or forbid OBSS reuse, in a similar manner as discussed above.

FIGS. 5A, 5B, 5C, and 5D show examples of transmissions by a first BSS transmitter 505 and an OBSS transmitter 510, in accordance with various aspects of the present disclosure. The first BSS transmitter may be an AP or STA of a first BSS, and may be examples of aspects of APs 105 or STAs 110 described with reference to FIGS. 1-4.

Figure 5A:
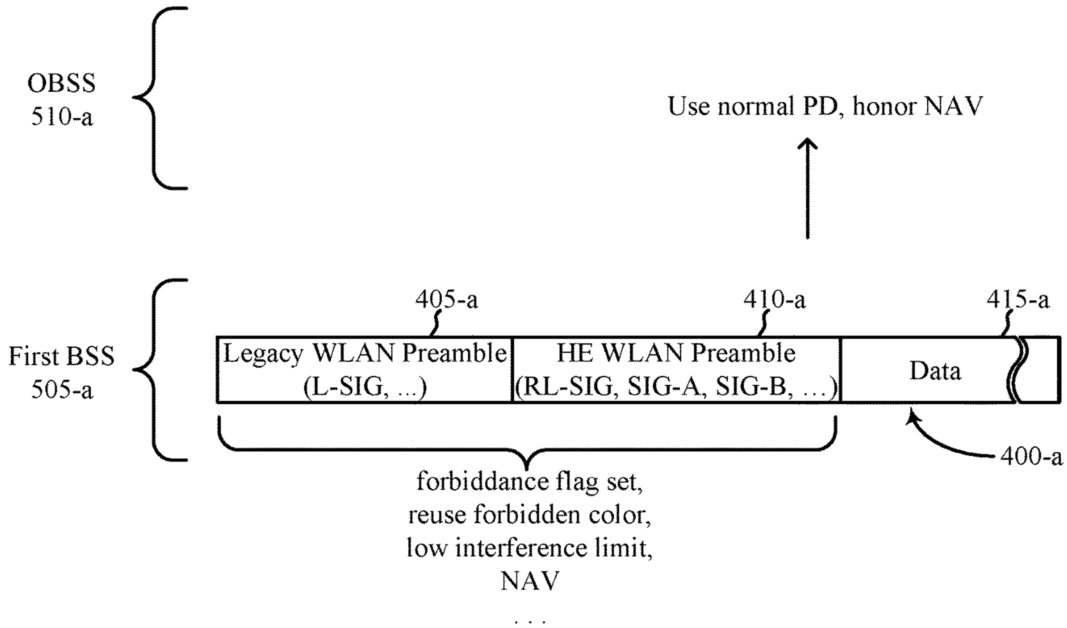
FIGS. 5A, 5B, 5C, and 5D illustrate aspects of OBSS transmission forbiddance in accordance with various aspects of the present disclosure.

In the example of FIG. 5A, a first BSS transmitter 505-*a* may transmit a WLAN PDU 400-*a* which may be an example of aspects of the WLAN PDU 400 described with reference to FIG. 4. The WLAN PDU 400-*a* may include a legacy WLAN preamble 405-*a*, a HE WLAN preamble 410-*a*, and/or a data field 415-*a*. The legacy WLAN preamble 405-*a*, HE WLAN preamble 410-*a*, and data field 415-*a* may be examples of the legacy WLAN preamble 405, HE WLAN preamble 410, and data field 415 of FIG. 4. The HE WLAN preamble 410-*a* may include an OBSS reuse forbiddance indicator as discussed above, such as a forbiddance flag, a color field that may be set to allow or forbid OBSS reuse, an interference limit, etc. In the example of FIG. 5A, the HE WLAN preamble 410-*a* may include an indication that OBSS reuse is forbidden. As a result, the OBSS transmitter 510-*a* may not transmit a concurrent transmission with WLAN PDU 400-*a*, through use of legacy deferral rules such as normal power density threshold and honoring a NAV provided with WLAN PDU 400-*a*. In some examples, as mentioned above, first BSS transmitter 505-*a* may implement one or more disincentive rules in conjunction with forbidding OBSS reuse, which may include, for example, that the first BSS transmitter 505-*a* is not allowed to perform OBSS reuse on OBSS transmitters for the duration of the OBSS reuse forbiddance (or for a longer period as established by the disincentive rule), or adjusting an EDCA level for AC priority, for example.

Figure 5B:
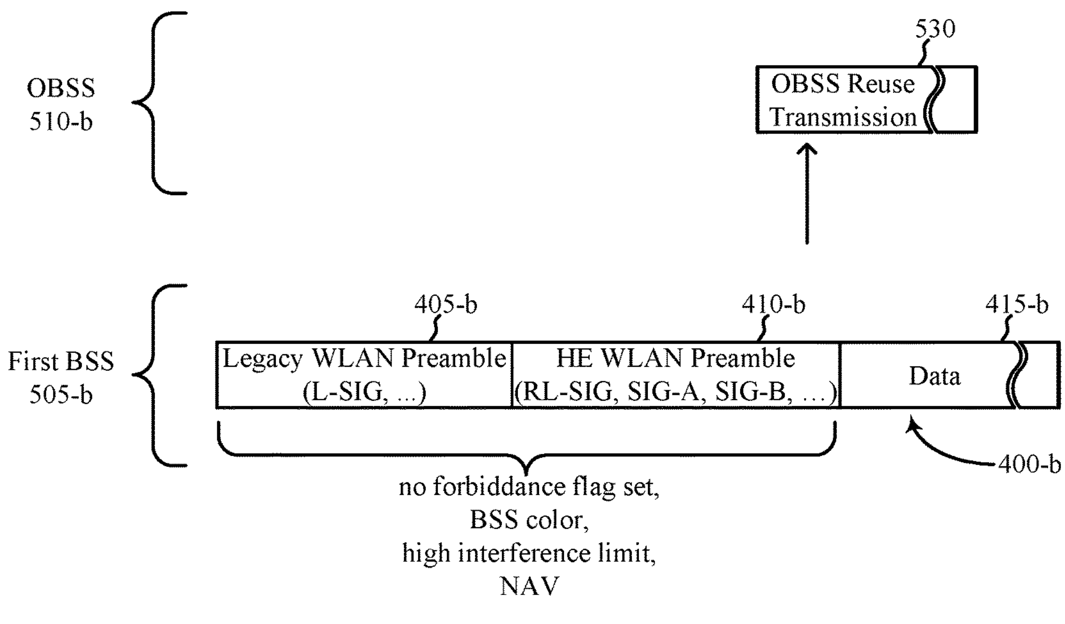

In the example of FIG. 5B, first BSS transmitter 505-*b* may transmit a WLAN PDU 400-*b* which may include a legacy WLAN preamble 405-*b*, a HE WLAN preamble 410-*b*, and/or a data field 415-*b*. In this example, HE WLAN preamble 410-*b* may indicate OBSS reuse is allowed, such as through an indicator such as a forbiddance flag being cleared, a BSS color provided that indicates reuse is allowed, or a high interference limit, for example. In such an example, OBSS transmitter 510-*b* may transmit OBSS reuse transmission 530, which may be transmitted concurrently with WLAN PDU 400-*b*, assuming that the related OBSS power density threshold and related parameters are met.

Figure 5C:
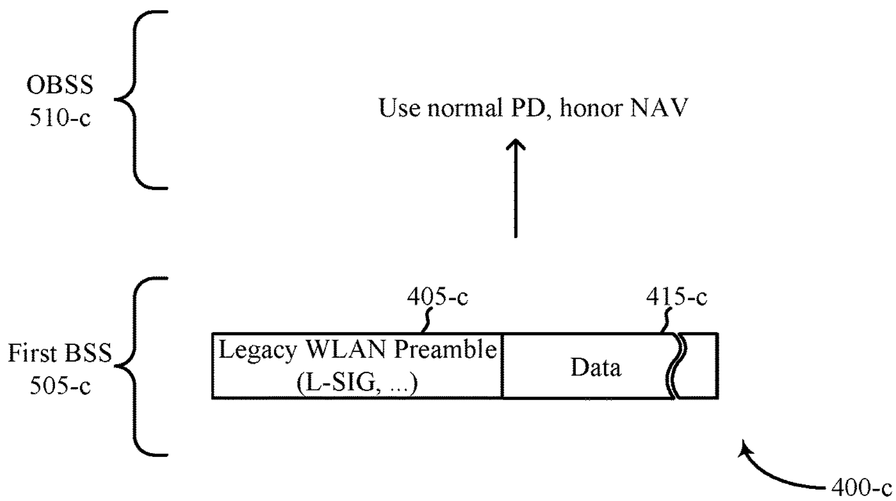

In the example of FIG. 5C, first BSS transmitter 505-*c* may transmit a non-HE WLAN PDU 400-*c*, that may be transmitted to forbid OBSS transmitter 510-*c* from OBSS reuse. The non-HE WLAN PDU 400-*c* may include a legacy WLAN preamble 405-*c*, and a data field 415-*c*. In such an example, OBSS transmitter 510-*c* may not transmit a concurrent transmission with WLAN PDU 400-*c*, through use of legacy deferral rules such as normal PD threshold and honoring a NAV provided with WLAN PDU 400-*c*. In some examples, as mentioned above, first BSS transmitter 505-*c* may implement a disincentive rule in conjunction with transmitting non-HE WLAN PDU 400-*c*, which may include, for example, that the first BSS transmitter 505-*c* is allowed only to transmit non-HE WLAN PDUs 400-*c* for the duration of the OBSS reuse forbiddance, or for a longer period as established by the disincentive rule.

Figure 5D:
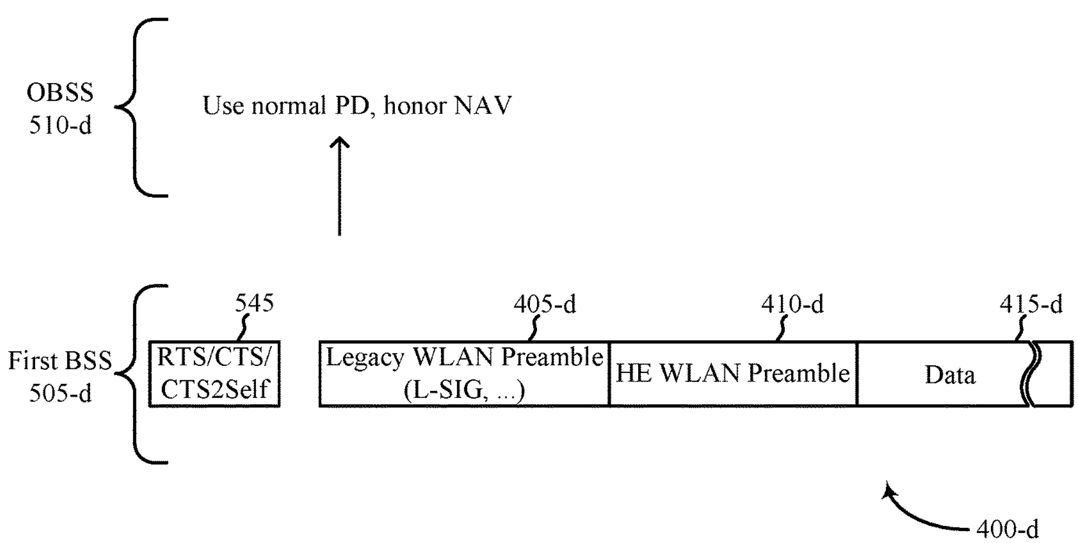

In the example of FIG. 5D, first BSS transmitter 505-*d* may transmit a HE (or non-HE) WLAN PDU 400-*d*, with a RTS/CTS/CTS2Self transmission 545 that precedes the WLAN PDU 400-*d* that may be transmitted to forbid OBSS transmitter 510-*d* from OBSS reuse. The WLAN PDU 400-*d* may include a legacy WLAN preamble 405-*d*, a HE WLAN preamble 410-*d*, and a data field 415-*d*. In such an example, OBSS transmitter 510-*d* may not transmit a concurrent transmission with WLAN PDU 400-*d*, through use of legacy deferral rules such as normal power density threshold and honoring a NAV provided with WLAN PDU 400-*d*. In some examples, as mentioned above, first BSS transmitter 505-*d* may implement a disincentive rule in conjunction with transmitting CTS/RTS/CTS2Self 545, which may include, for example, that the first BSS transmitter 505-*d* is not allowed to perform OBSS reuse on OBSS transmitters for the duration of the OBSS reuse forbiddance (or for a longer period as established by the disincentive rule), or adjusting an EDCA level for AC priority, for example.

Figure 6:
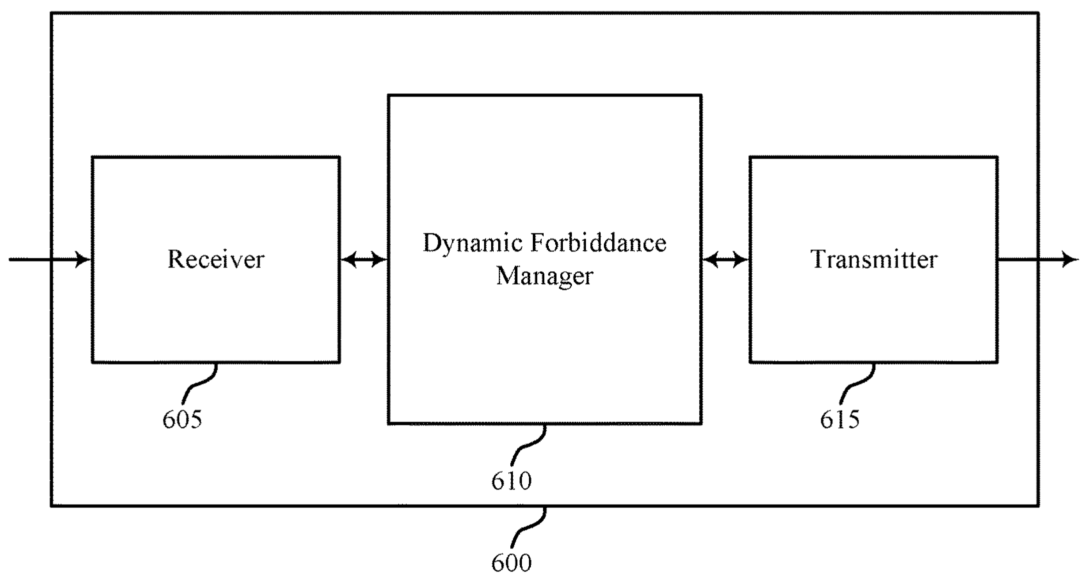
FIGS. 6 through 8 show block diagrams of a wireless device that supports dynamic forbiddance of wireless transmissions by OBSSs in accordance with aspects of the present disclosure.

FIG. 6 shows a block diagram of a wireless device 600 that supports dynamic forbiddance of wireless transmissions by OBSSs in accordance with various aspects of the present disclosure. Wireless device 600 may be an example of aspects of a STA 110 or AP 105 described with reference to FIGS. 1-5. Wireless device 600 may include receiver 605, dynamic forbiddance manager 610 and transmitter 615. Wireless device 600 may also include a processor. Each of these components may be in communication with each other.

The receiver 605 may receive information such as packets, user data, or control information associated with various information channels (e.g., control channels, data channels, and information related to dynamic forbiddance of wireless transmissions by OBSSs, etc.). Information may be passed on to other components of the device. The receiver 605 may be an example of aspects of the transceiver 925 described with reference to FIG. 9.

The dynamic forbiddance manager 610 may identify a first transmission to be transmitted from a first transmitter of a first BSS, and dynamically forbid one or more other transmitters of an OBSS that overlaps with the first BSS from concurrent transmissions with the first transmitter during the first transmission. The dynamic forbiddance manager 610 may set a value in a preamble of a frame that indicates concurrent OBSS transmissions are forbidden. The dynamic forbiddance manager 610 may also be an example of aspects of the dynamic forbiddance manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
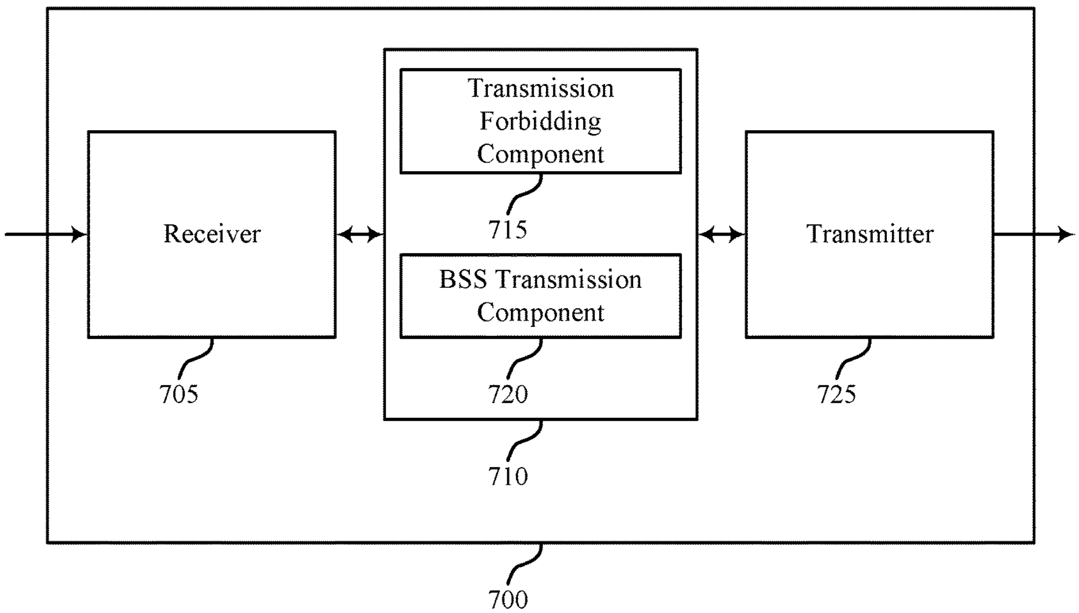

FIG. 7 shows a block diagram of a wireless device 700 that supports dynamic forbiddance of wireless transmissions by OBSSs in accordance with various aspects of the present disclosure. Wireless device 700 may be an example of aspects of a wireless device 600 or a STA 110 or AP 105 described with reference to FIGS. 1-6. Wireless device 700 may include receiver 705, dynamic forbiddance manager 710 and transmitter 725. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The dynamic forbiddance manager 710 may be an example of aspects of dynamic forbiddance manager 610 described with reference to FIG. 6. The dynamic forbiddance manager 710 may include transmission forbidding component 715 and BSS transmission component 720. The dynamic forbiddance manager 710 may be an example of aspects of the dynamic forbiddance manager 905 described with reference to FIG. 9.

The transmission forbidding component 715 may dynamically forbid one or more other transmitters of an OBSS that overlaps with the first BSS from concurrent transmissions with the first transmitter during the first transmission. The transmission forbidding component 715 may set a value in a preamble of a frame that indicates concurrent OBSS transmissions are forbidden. In some cases the wireless device 700 may be part of an AP and the transmission forbidding component 715 may transmit information to one or more stations in the first BSS to enable the one or more stations to identify data frame characteristics and dynamically forbid other transmitters of the OBSS from transmitting during a transmission of the one or more stations. In some cases, the wireless device 700 may be part of a station and the transmission forbidding component 715 may receive information from an AP in the first BSS to enable the station to identify data frame characteristics and dynamically forbid other transmitters of the OBSS from transmitting during a transmission of the station.

In some cases, a first transmitter may indicate that transmitters of the OBSS are to use a normal power density level and honor a network allocation vector (NAV) of the data frame. In some cases, an AP may provide information to one or more stations to configure dynamic OBSS forbiddance. The information may include, for example, a single bit indicator transmitted to the one or more stations. In some cases, the information may include one or more parameters for use by the one or more stations to determine whether to enable the identification of data frame characteristics and dynamically forbid other transmitters of the OBSS from transmitting during a transmission of the one or more stations.

In some cases, the AP or STA of the first BSS may identify one or more parameters that determine whether to forbid OBSS reuse. In some examples, the one or more parameters may comprise an allowed interference parameter that is set to a low value to forbid concurrent transmissions through allowance of little or no interference, or that is set to a high value to allow concurrent transmissions through allowance of higher levels of interference.

The BSS transmission component 720 may identify a first transmission to be transmitted from a first transmitter of a first BSS. The transmitter 725 may transmit signals received from other components of wireless device 700. In some examples, the transmitter 725 may be collocated with a receiver in a transceiver module. For example, the transmitter 725 may be an example of aspects of the transceiver 925 described with reference to FIG. 9. The transmitter 725 may utilize a single antenna, or it may utilize a plurality of antennas.

Figure 8:
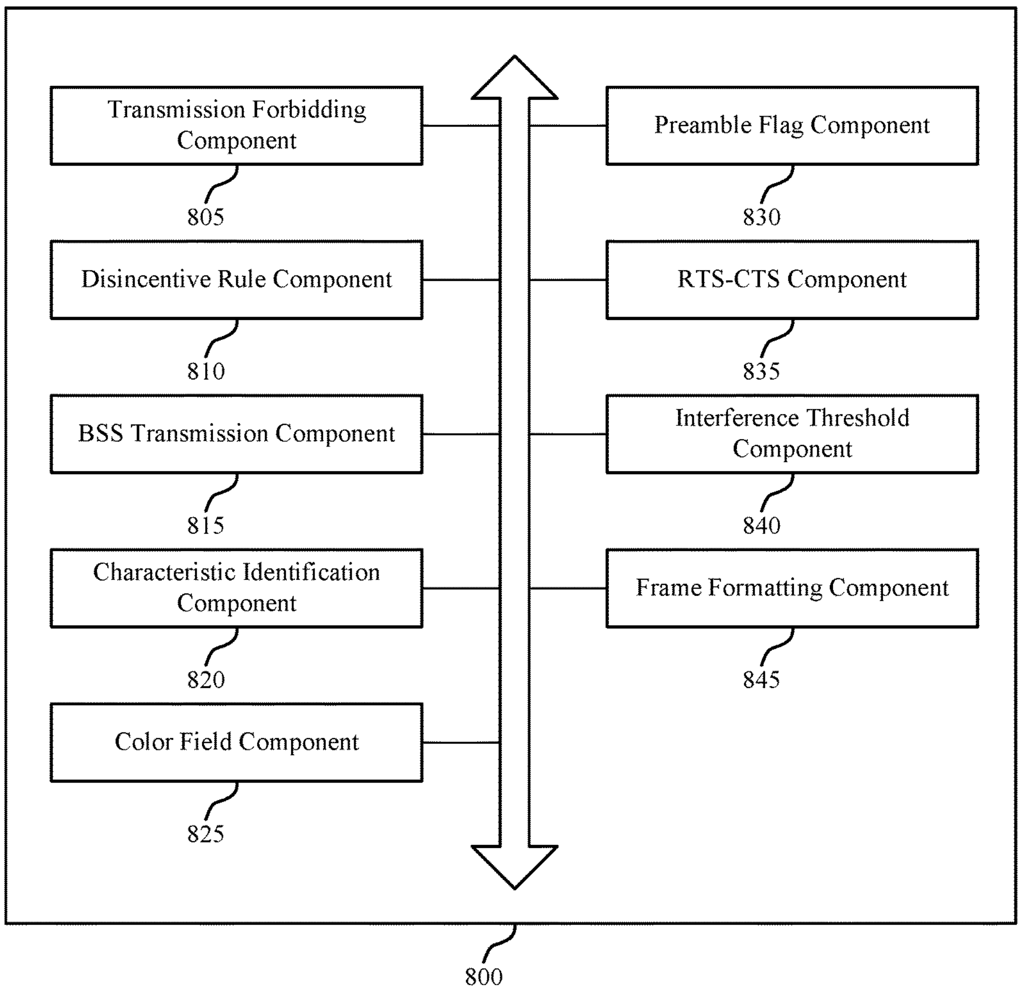

FIG. 8 shows a block diagram of a dynamic forbiddance manager 800 which may be an example of the corresponding component of wireless device 600 or wireless device 700. That is, dynamic forbiddance manager 800 may be an example of aspects of dynamic forbiddance manager 610 or dynamic forbiddance manager 710 described with reference to FIGS. 6 and 7. The dynamic forbiddance manager 800 may also be an example of aspects of the dynamic forbiddance manager 905 described with reference to FIG. 9.

The dynamic forbiddance manager 800 may include transmission forbidding component 805, disincentive rule component 810, BSS transmission component 815, characteristic identification component 820, color field component 825, preamble flag component 830, RTS-CTS component 835, interference threshold component 840 and frame formatting component 845. Each of these modules may communicate, directly or indirectly, with one another (e.g., via one or more buses).

The transmission forbidding component 805 may dynamically forbid one or more other transmitters of an OBSS that overlaps with the first BSS from concurrent transmissions with the first transmitter during the first transmission. The transmission forbidding component 805 may set a value in a preamble of a frame that indicates concurrent OBSS transmissions are forbidden The disincentive rule component 810 may apply one or more disincentive rules based on the dynamically forbidding concurrent transmissions. In some cases, the one or more disincentive rules are configured by an AP and transmitted to one or more stations of the first BSS. In some cases, the one or more disincentive rules comprise transmitting only non-high-efficiency (non-HE) data frames for a predetermined time period if a non-HE frame is used to indicate to the one or more transmitters of the OBSS that concurrent transmissions are forbidden. In certain cases, the one or more disincentive rules comprise indicating a lower channel priority for the first transmission than the channel priority that would be indicated if the first transmission were transmitted without an indication that concurrent transmissions are forbidden. In some cases, the one or more disincentive rules comprise limiting available wireless resources that may be used to indicate concurrent transmissions are forbidden to a subset of available resources.

The BSS transmission component 815 may identify a first transmission to be transmitted from a first transmitter of a first BSS. The characteristic identification component 820 may identify one or more characteristics of the first transmission, and the dynamically forbidding may be based at least in part on the identified one or more characteristics. In some cases, the one or more characteristics comprise one or more channel quality characteristics or quality of service characteristics. The one or more channel quality characteristics may include one or more of: a PDU failure rate that exceeds an associated threshold, a PDU error rate that exceeds an associated threshold, a PDU retry count that exceeds an associated threshold, a signal-to-interference-and-noise ratio (SINR), a received signal strength indication, or a maximum supported modulation and coding scheme that is less than an associated threshold, a percentage of transmissions that experience bursty interference that exceeds an associated threshold, a SINR degradation of data payload versus preamble that exceeds a threshold, or an accessed air time that is less than an associated threshold. In some cases, the one or more quality of service characteristics comprise one or more of a latency associated with data to be transmitted in the transmission of the first transmitter or a transmission priority associated with data to be transmitted by the first transmitter.

The color field component 825 may set a color field in a preamble of a data frame of the transmission to a predefined value that indicates concurrent OBSS transmissions are forbidden. The preamble flag component 830 may set a flag in a preamble of a frame that indicates concurrent OBSS transmissions are forbidden. In some cases, the preamble flag may be located in a preamble of the non-HE frame, such as in a service field, a transmitter address field, or a receiver address field.

The RTS-CTS component 835 may generate and transmit one or more of a request-to-send or a clear-to-send (including CTS2Self) transmission preceding the transmission of the first transmitter. In some cases, the request-to-send or clear-to-send transmission indicates to the one or more transmitters of the OBSS that concurrent transmissions are forbidden according to legacy deferral rules.

The interference threshold component 840 may generate and transmit an interference threshold in a preamble of a data frame transmitted during the transmission, the interference threshold may indicate an amount of interference tolerated by the data frame. In some cases, the interference threshold may be set at a low level to indicate concurrent OBSS transmissions are forbidden through allowance of little or no interference.

The frame formatting component 845 may format a data frame transmitted by the first transmitter during the transmission as a non-high-efficiency (non-HE) frame that indicates to the one or more transmitters of the OBSS that concurrent transmissions are forbidden according to legacy deferral rules.

Figure 9:
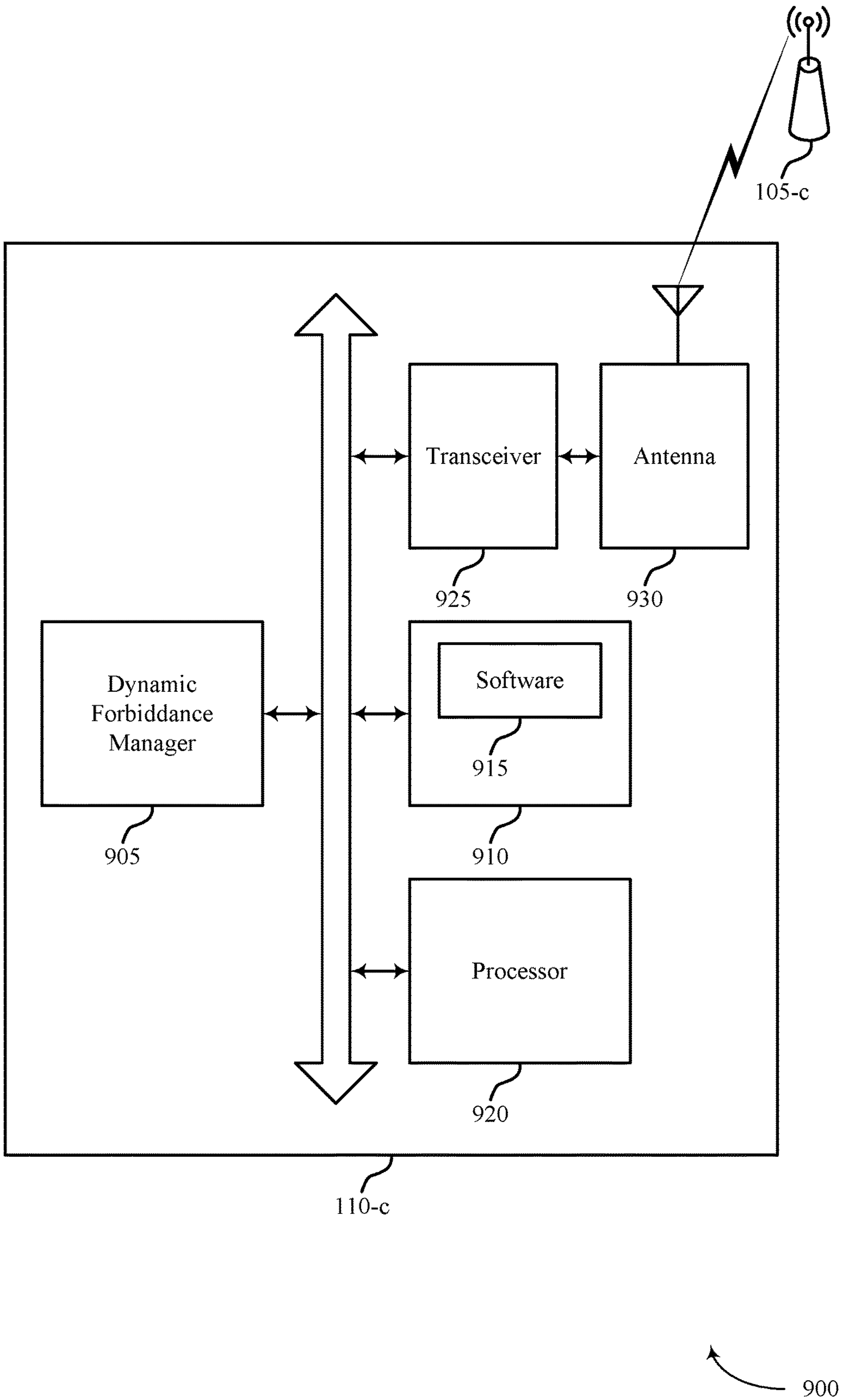
FIG. 9 illustrates a block diagram of a system including a station (STA) that supports dynamic forbiddance of wireless transmissions by OBSSs in accordance with aspects of the present disclosure.

FIG. 9 shows a diagram of a system 900 including a device that supports dynamic forbiddance of wireless transmissions by OBSSs in accordance with various aspects of the present disclosure. For example, system 900 may include STA 110-*c*, which may be an example of a wireless device 600, a wireless device 700, or a STA 110 as described with reference to FIGS. 1 through 8.

STA 110-*c* may also include dynamic forbiddance manager 905, memory 910, processor 920, transceiver 925, and antenna 930. Each of these modules may communicate, directly or indirectly, with one another (e.g., via one or more buses). The dynamic forbiddance manager 905 may be an example of a dynamic forbiddance manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., dynamic forbiddance of wireless transmissions by OBSSs, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with an AP 105 or a STA 110. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

Figure 10:
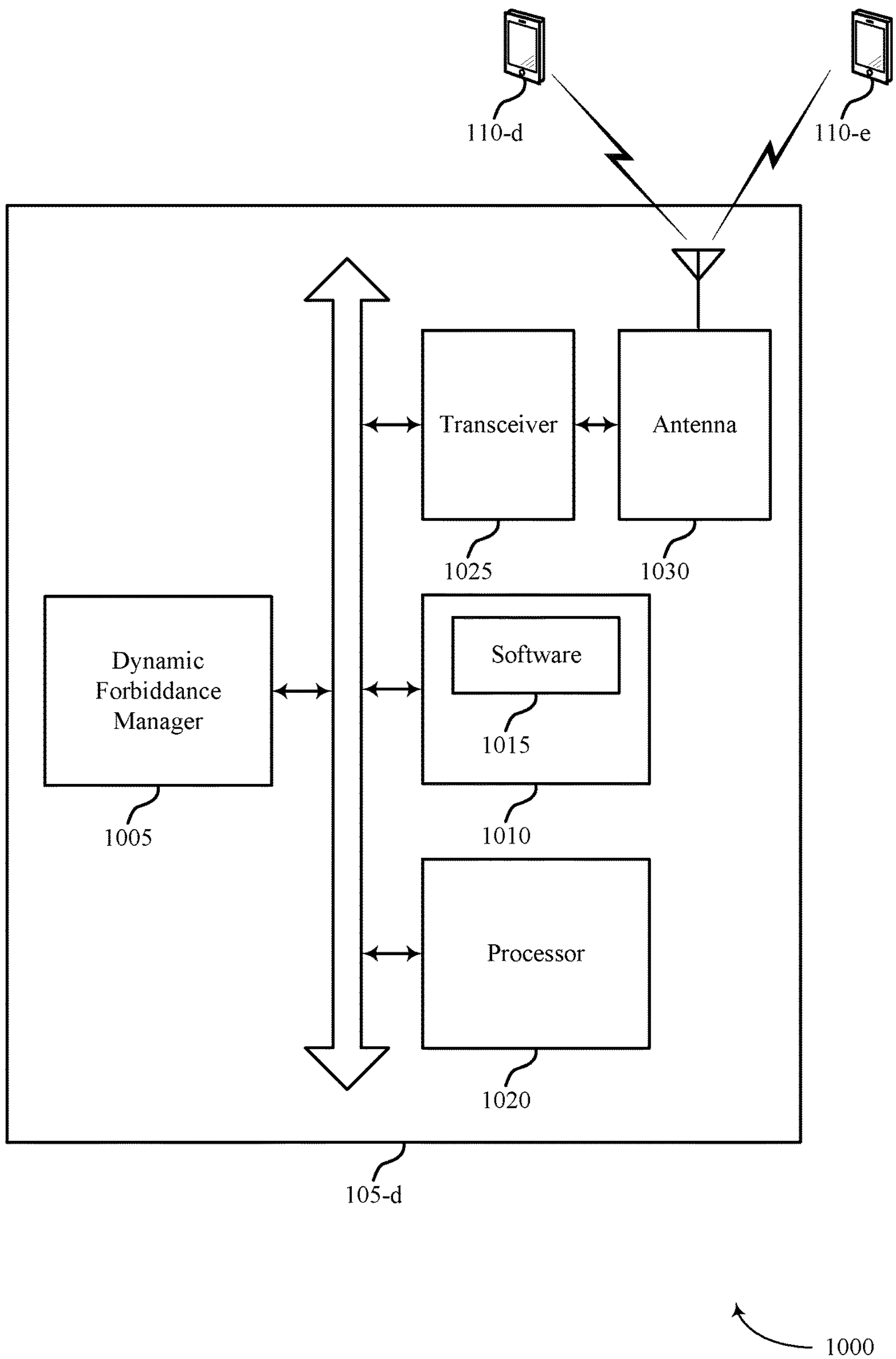
FIG. 10 illustrates a block diagram of a system including an AP that supports dynamic forbiddance of wireless transmissions by OBSSs in accordance with aspects of the present disclosure.

FIG. 10 shows a diagram of a system 1000 including a device that supports dynamic forbiddance of wireless transmissions by OBSSs in accordance with various aspects of the present disclosure. For example, system 1000 may include AP 105-*d*, which may be an example of a wireless device 600, a wireless device 700, or an AP 105 as described with reference to FIGS. 1 through 8.

AP 105-*d* may also include dynamic forbiddance manager 1005, memory 1010, processor 1020, transceiver 1025, and antenna 1030. Each of these modules may communicate, directly or indirectly, with one another (e.g., via one or more buses). The dynamic forbiddance manager 1005 may be an example of a dynamic forbiddance manager as described with reference to FIGS. 6 through 8.

The memory 1010 may include RAM and ROM. The memory 1010 may store computer-readable, computer-executable software including instructions that, when executed, cause the processor to perform various functions described herein (e.g., dynamic forbiddance of wireless transmissions by OBSSs, etc.). In some cases, the software 1015 may not be directly executable by the processor but may cause a computer (e.g., when compiled and executed) to perform functions described herein. The processor 1020 may include an intelligent hardware device, (e.g., a CPU, a microcontroller, an ASIC, etc.)

The transceiver 1025 may communicate bi-directionally, via one or more antennas, wired, or wireless links, with one or more networks, as described above. For example, the transceiver 1025 may communicate bi-directionally with an AP 105 or a STA 110. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions.

Figure 11:
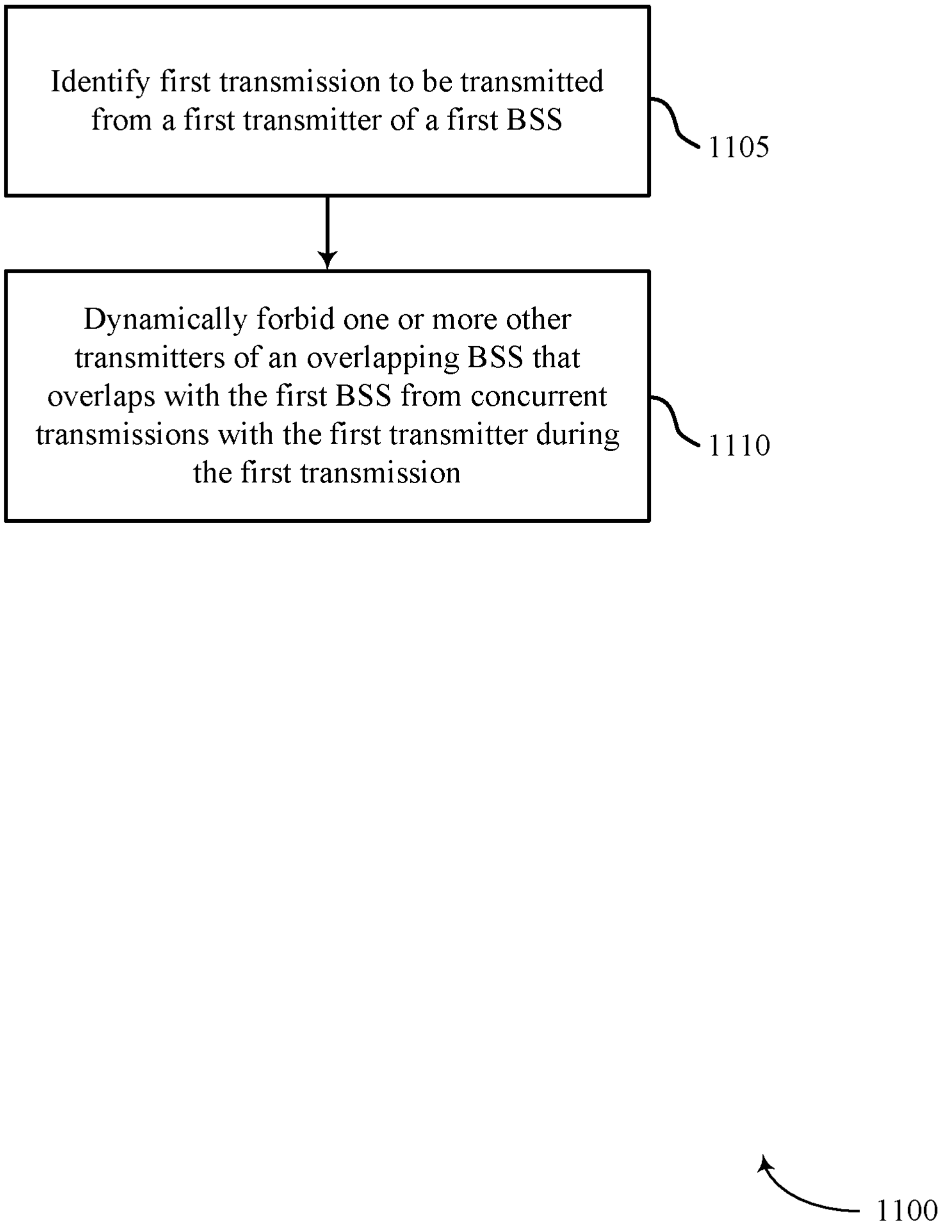
FIGS. 11 through 14 illustrate methods for dynamic forbiddance of wireless transmissions by OBSSs in accordance with aspects of the present disclosure.

FIG. 11 shows a flowchart illustrating a method 1100 for dynamic forbiddance of wireless transmissions by OBSSs in accordance with various aspects of the present disclosure. The operations of method 1100 may be implemented by a device such as a STA 110 or AP 105 or its components as described with reference to FIGS. 1 through 5, 9, or 10. For example, the operations of method 1100 may be performed by the dynamic forbiddance manager as described herein. In some examples, the STA 110 or AP 105 may execute a set of codes to control the functional elements of the device to perform the functions described below. Additionally or alternatively, the STA 110 or AP 105 may perform aspects of the functions described below using special-purpose hardware.

At block 1105, the STA 110 or AP 105 may identify a first transmission to be transmitted from a first transmitter of a first BSS as described above with reference to FIGS. 2 through 5. In certain examples, the operations of block 1105 may be performed by the BSS transmission component as described with reference to FIG. 7 or FIG. 8.

At block 1110, the STA 110 or AP 105 may dynamically forbid one or more other transmitters of an OBSS that overlaps with the first BSS from concurrent transmissions with the first transmitter during the first transmission as described above with reference to FIGS. 2 through 5. The dynamically forbidding may include setting a value in a preamble of a frame that indicates concurrent OBSS transmissions are forbidden. In certain examples, the operations of block 1110 may be performed by the transmission forbidding component as described with reference to FIG. 7 or FIG. 8.

Figure 12:
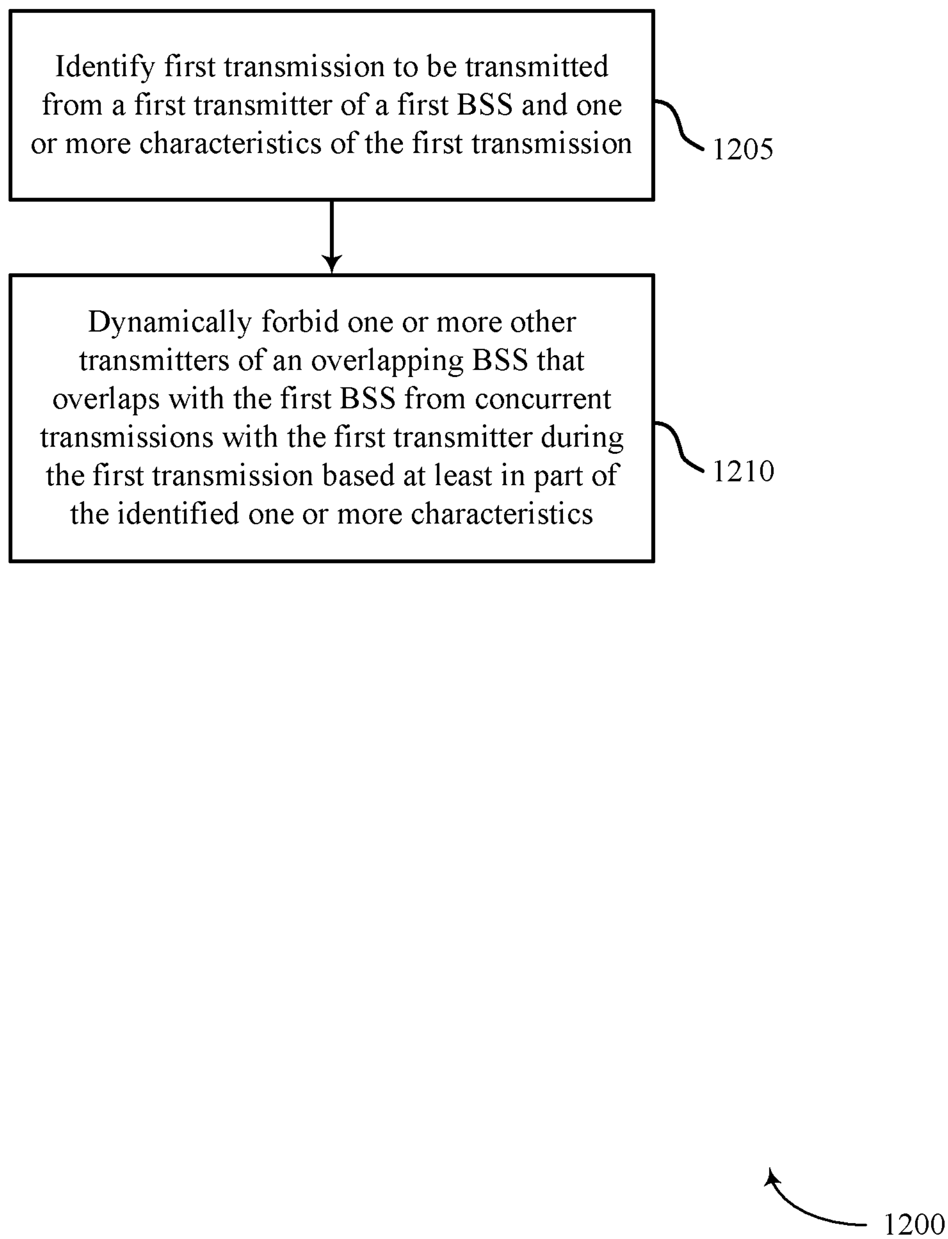

FIG. 12 shows a flowchart illustrating a method 1200 for dynamic forbiddance of wireless transmissions by OBSSs in accordance with various aspects of the present disclosure. The operations of method 1200 may be implemented by a device such as a STA 110 or AP 105 or its components as described with reference to FIGS. 1 through 5, 9, or 10. For example, the operations of method 1200 may be performed by the dynamic forbiddance manager as described herein. In some examples, the STA 110 or AP 105 may execute a set of codes to control the functional elements of the device to perform the functions described below. Additionally or alternatively, the STA 110 or AP 105 may perform aspects of the functions described below using special-purpose hardware.

At block 1205, the STA 110 or AP 105 may identify a first transmission to be transmitted from a first transmitter of a first BSS and one or more characteristics of the first transmission as described above with reference to FIGS. 2 through 5. In certain examples, the operations of block 1205 may be performed by the BSS transmission component as described with reference to FIG. 7 or FIG. 8.

At block 1210, the STA 110 or AP 105 may dynamically forbid one or more other transmitters of an OBSS that overlaps with the first BSS from concurrent transmissions with the first transmitter during the first transmission based at least in part on the identified one or more characteristics as described above with reference to FIGS. 2 through 5. The dynamically forbidding may include setting a value in a preamble of a frame that indicates concurrent OBSS transmissions are forbidden. In certain examples, the operations of block 1210 may be performed by the transmission forbidding component as described with reference to FIG. 7 or FIG. 8.

Figure 13:
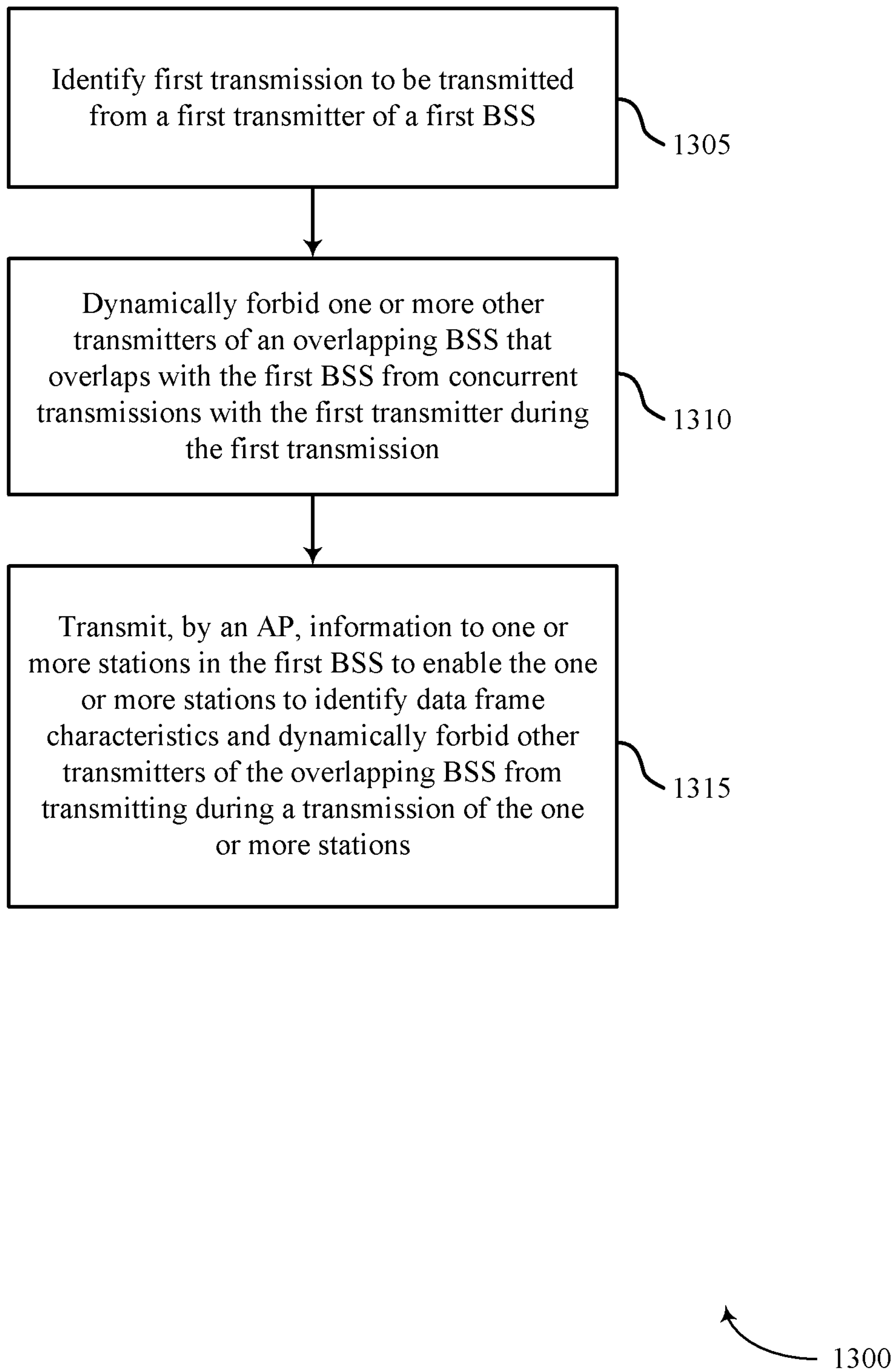

FIG. 13 shows a flowchart illustrating a method 1300 for dynamic forbiddance of wireless transmissions by OBSSs in accordance with various aspects of the present disclosure. The operations of method 1300 may be implemented by a device such as an AP 105 or its components as described with reference to FIGS. 1 through 5, or 10. For example, the operations of method 1300 may be performed by the dynamic forbiddance manager as described herein. In some examples, the AP 105 may execute a set of codes to control the functional elements of the device to perform the functions described below. Additionally or alternatively, the AP 105 may perform aspects of the functions described below using special-purpose hardware.

At block 1305, the AP 105 may identify a first transmission to be transmitted from a first transmitter of a first BSS as described above with reference to FIGS. 2 through 5. In certain examples, the operations of block 1305 may be performed by the BSS transmission component as described with reference to FIG. 7 or FIG. 8.

At block 1310, the AP 105 may dynamically forbid one or more other transmitters of an OBSS that overlaps with the first BSS from concurrent transmissions with the first transmitter during the first transmission as described above with reference to FIGS. 2 through 5. The dynamically forbidding may include setting a value in a preamble of a frame that indicates concurrent OBSS transmissions are forbidden. In certain examples, the operations of block 1310 may be performed by the transmission forbidding component as described with reference to FIG. 7 or FIG. 8.

At block 1315, the AP 105 may transmit information to one or more stations in the first BSS to enable the one or more stations to identify data frame characteristics and dynamically forbid other transmitters of the OBSS from transmitting during a transmission of the one or more stations as described above with reference to FIGS. 2 through 5. In certain examples, the operations of block 1315 may be performed by the transmission forbidding component as described with reference to FIG. 7 or FIG. 8. In some examples, the AP 105 may simply instruct the STAs whether they should allow or forbid reuse, without having the STAs measure and identify frame characteristics. In some examples, the AP may execute block 1315 without having forbidden reuse on any of its own frames. In other words, the AP 105 may skip steps at blocks 1305 and 1310 and go straight to 1315.

Figure 14:
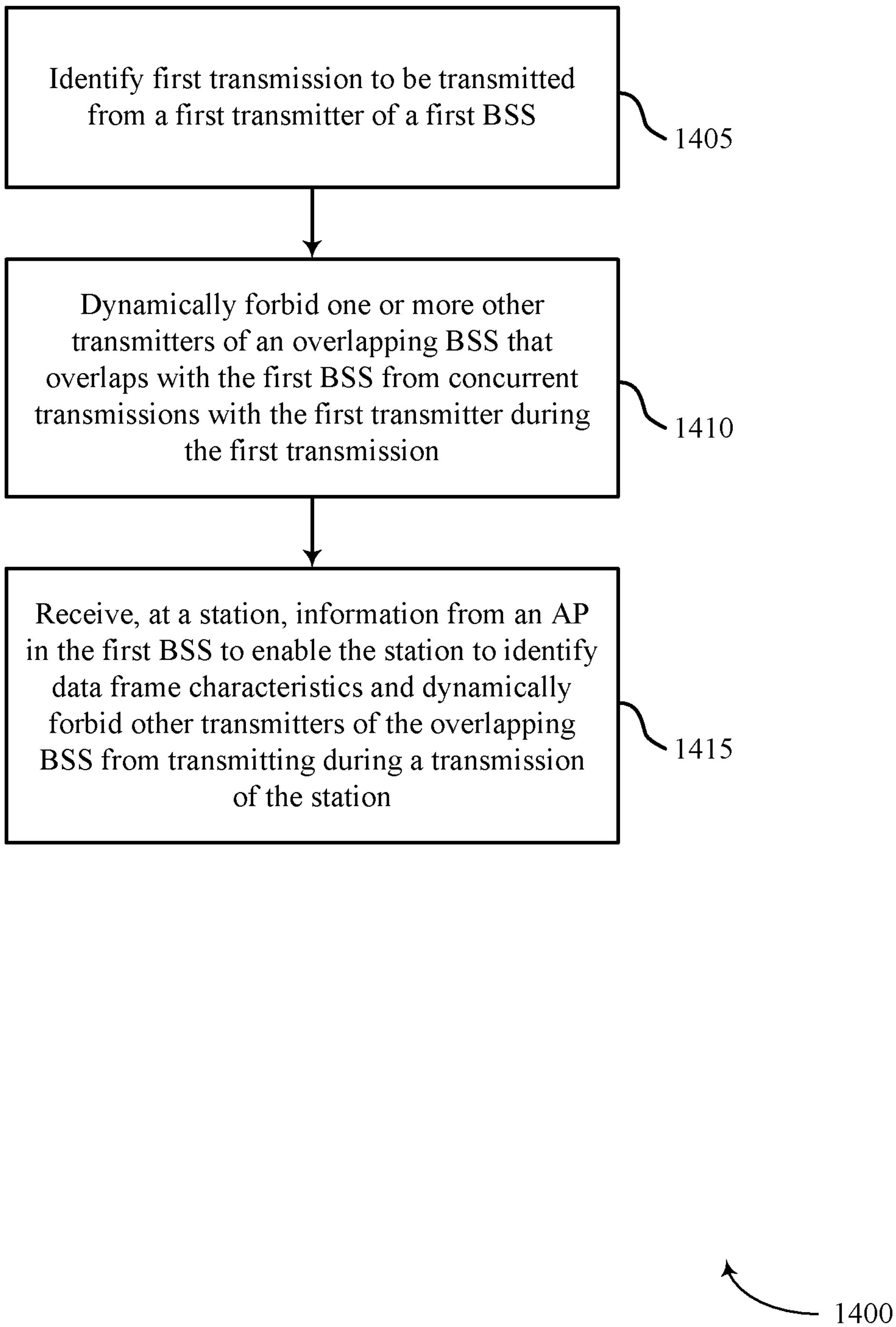

FIG. 14 shows a flowchart illustrating a method 1400 for dynamic forbiddance of wireless transmissions by OBSSs in accordance with various aspects of the present disclosure. The operations of method 1400 may be implemented by a device such as a STA 110 or its components as described with reference to FIGS. 1 through 5, or 9. For example, the operations of method 1400 may be performed by the dynamic forbiddance manager as described herein. In some examples, the STA 110 may execute a set of codes to control the functional elements of the device to perform the functions described below. Additionally or alternatively, the STA 110 may perform aspects of the functions described below using special-purpose hardware.

At block 1405, the STA 110 may identify a first transmission to be transmitted from a first transmitter of a first BSS as described above with reference to FIGS. 2 through 5. In certain examples, the operations of block 1405 may be performed by the BSS transmission component as described with reference to FIG. 7 or FIG. 8.

At block 1410, the STA 110 may dynamically forbid one or more other transmitters of an OBSS that overlaps with the first BSS from concurrent transmissions with the first transmitter during the first transmission as described above with reference to FIGS. 2 through 5. The dynamically forbidding may include setting a value in a preamble of a frame that indicates concurrent OBSS transmissions are forbidden. In certain examples, the operations of block 1410 may be performed by the transmission forbidding component as described with reference to FIG. 7 or FIG. 8.

At block 1415, the STA 110 may receive information from an AP in the first BSS to enable the station to identify data frame characteristics and dynamically forbid other transmitters of the OBSS from transmitting during a transmission of the station as described above with reference to FIGS. 2 through 5. In certain examples, the operations of block 1415 may be performed by the transmission forbidding component as described with reference to FIG. 7 or FIG. 8. In some examples the STA may receive information from the AP instructing it to allow or forbid reuse without having to identify data frame characteristics. In some instances the STA may wait for instructions from the AP before deciding to forbid to allow reuse. In these instances, the STA skips steps represented at blocks 1405 of 1410 and goes directly to 1415.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for dynamic forbiddance of wireless transmissions by OBSSs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, “or” as used in a list of items (for example, a list of items prefaced by a phrase such as “at least one of” or “one or more”) indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Thus, aspects of the disclosure may provide for dynamic forbiddance of wireless transmissions by OBSSs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication, comprising:

identifying a first transmission to be transmitted from a first transmitter of a first basic service set (BSS), the first transmission having a first duration;

generating a preamble of a frame, wherein the preamble is configured to dynamically forbid one or more other transmitters of an overlapping BSS that overlaps with the first BSS from concurrent transmissions with the first transmitter during the first transmission, wherein generating the preamble comprises setting a first field in the preamble that is a BSS identifier and a second field in the preamble that comprises an overlapping BSS reuse forbiddance indicator, wherein the second field is different from a color field and indicates one or more other transmitters of the overlapping BSS are forbidden from using a wireless channel during the first duration; and transmitting the preamble from a transmitter of the first BSS over the wireless channel.

2. The method of claim 1, wherein the identifying the first transmission further comprises identifying one or more characteristics of the first transmission, and wherein the dynamically forbidding is based at least in part on the identified one or more characteristics.

3. The method of claim 1, wherein the setting the second field in the preamble of the frame comprises setting a flag in the preamble of the frame.

4. The method of claim 1, wherein the dynamically forbidding comprises transmitting one or more of a request to send (RTS) or a clear to send (CTS) transmission preceding the transmission of the first transmitter.

5. The method of claim 4, wherein the RTS or CTS transmission indicates to the one or more other transmitters of the overlapping BSS that concurrent transmissions are forbidden according to legacy deferral rules.

6. The method of claim 1, wherein the dynamically forbidding comprises transmitting an interference threshold in a preamble of a data frame transmitted during the first transmission, the interference threshold indicating an amount of interference tolerated by the data frame.

7. The method of claim 6, wherein the dynamically forbidding further comprises setting the interference threshold at a low level to indicate concurrent overlapping BSS transmissions are forbidden through allowance of little or no interference.

8. The method of claim 1, further comprising:

applying one or more disincentive rules based on the dynamically forbidding concurrent transmissions.

9. The method of claim 8, wherein the one or more disincentive rules are configured by an access point and transmitted to one or more stations of the first BSS.

10. The method of claim 8, wherein the one or more disincentive rules comprise mandating that the first transmitter not transmit concurrently with transmitters of the overlapping BSS if the first transmitter is transmitting a packet that forbids concurrent transmissions.

11. The method of claim 8, wherein the one or more disincentive rules comprise indicating a lower channel priority for the first transmission than a channel priority that would be indicated if the first transmission were transmitted without an indication that concurrent transmissions are forbidden.

12. The method of claim 8, wherein the one or more disincentive rules comprise limiting available wireless resources that may be used to indicate concurrent transmissions are forbidden to a subset of available resources.

13. The method of claim 1, further comprising:

transmitting, by an access point (AP) in the first BSS, information to one or more stations in the first BSS to enable or disable the one or more stations to dynamically forbid other transmitters of the overlapping BSS from transmitting during a transmission of the one or more stations.

14. The method of claim 13, wherein the enabling is based on identifying data frame characteristics.

15. The method of claim 13, wherein the information comprises a single bit indicator transmitted to the one or more stations.

16. The method of claim 13, wherein the information comprises one or more parameters for use by the one or more stations to determine whether to enable dynamically forbidding other transmitters of the overlapping BSS from transmitting during a transmission of the one or more stations.

17. The method of claim 16, wherein the one or more parameters comprise an allowed interference parameter that is set to a low value to forbid concurrent transmissions through allowance of little or no interference, or that is set to a high value to allow concurrent transmissions through allowance of higher levels of interference.

18. The method of claim 1, further comprising:

receiving, at a station in the first BSS, information from an access point in the first BSS to enable the station to identify data frame characteristics and dynamically forbid other transmitters of the overlapping BSS from transmitting during a transmission of the station.

19. An apparatus for wireless communication comprising:

means for identifying a first transmission to be transmitted from a first transmitter of a first basic service set (BSS), the first transmission having a first duration;

means for generating a preamble of a frame, wherein the preamble is configured to dynamically forbid one or more other transmitters of an overlapping BSS that overlaps with the first BSS from concurrent transmissions with the first transmitter during the first transmission, wherein the means for generating the preamble comprises means for setting a first field in the preamble that is a BSS identifier and a second field in the preamble that comprises an overlapping BSS reuse forbiddance indicator, wherein the second field is different from a color field and indicates one or more other transmitters of the overlapping BSS are forbidden from using a wireless channel during the first duration; and means for transmitting the preamble from a transmitter of the first BSS over the wireless channel.

20. An apparatus for wireless communication, comprising:

a processor;

memory in electronic communication with the processor; and instructions stored in the memory and operable, when executed by the processor, to cause the apparatus to:

identify a first transmission to be transmitted from a first transmitter of a first basic service set (BSS), the first transmission having a first duration;

generate a preamble of a frame, wherein the preamble is configured to dynamically forbid one or more other transmitters of an overlapping BSS that overlaps with the first BSS from concurrent transmissions with the first transmitter during the first transmission, wherein the instructions are executable by the processor to cause the apparatus to set a first field in the preamble that is a BSS identifier and a second field in the preamble that comprises an overlapping BSS reuse forbiddance indicator, wherein the second field is different from a color field and indicates one or more other transmitters of the overlapping BSS are forbidden from using a wireless channel during the first duration; and transmit the preamble from a transmitter of the first BSS over the wireless channel.

21. The apparatus of claim 20, wherein the instructions are executable by the processor to cause the apparatus to:

identify one or more characteristics of the first transmission; and dynamically forbid the one or more other transmitters of the overlapping BSS based at least in part on the identified one or more characteristics.

22. The apparatus of claim 20, wherein the instructions are executable by the processor to cause the apparatus to:

set a flag in the preamble of the frame.

23. The apparatus of claim 20, wherein the instructions are executable by the processor to cause the apparatus to:

transmit one or more of a request to send (RTS) or a clear to send (CTS) transmission preceding the transmission of the first transmitter.

24. The apparatus of claim 23, wherein the RTS or CTS transmission indicates to the one or more other transmitters of the overlapping BSS that concurrent transmissions are forbidden according to legacy deferral rules.

25. The apparatus of claim 20, wherein the instructions are executable by the processor to cause the apparatus to:

transmit an interference threshold in a preamble of a data frame transmitted during the first transmission, the interference threshold indicating an amount of interference tolerated by the data frame.

26. The apparatus of claim 25, wherein the instructions are executable by the processor to cause the apparatus to:

set the interference threshold at a low level to indicate concurrent overlapping BSS transmissions are forbidden through allowance of little or no interference.

27. The apparatus of claim 20, wherein the instructions are executable by the processor to cause the apparatus to:

apply one or more disincentive rules based on the dynamically forbidding concurrent transmissions.

28. A non-transitory computer-readable medium storing code for wireless communication, the code comprising instructions executable to:

identify a first transmission to be transmitted from a first transmitter of a first basic service set (BSS), the first transmission having a first duration;

generate a preamble of a frame, wherein the preamble is configured to dynamically forbid one or more other transmitters of an overlapping BSS that overlaps with the first BSS from concurrent transmissions with the first transmitter during the first transmission, wherein the code comprises instructions executable to set a first field in the preamble that is a BSS identifier and a second field in the preamble that comprises an overlapping BSS reuse forbiddance indicator, wherein the second field is different from a color field and indicates one or more transmitters of the overlapping BSS are forbidden from using a wireless channel during the first duration; and transmit the preamble from a transmitter of the first BSS over the wireless channel.

29. The apparatus of claim 20, wherein the instructions are executable by the processor to cause the apparatus to:

transmit, by an access point (AP) in the first BSS, information to one or more stations in the first BSS to enable or disable the one or more stations to dynamically forbid other transmitters of the overlapping BSS from transmitting during a transmission of the one or more stations.

30. The apparatus of claim 29, wherein the enabling is based on identifying data frame characteristics.

* * * * *